United States Patent
Shoa Hassani Lashdan et al.

(10) Patent No.: US 11,343,474 B2
(45) Date of Patent: May 24, 2022

(54) IMAGE CAPTURE BASED ON ACTION RECOGNITION

(71) Applicant: QUALCOMM Incorporated, San Diego, CA (US)

(72) Inventors: Alireza Shoa Hassani Lashdan, Burlington (CA); Darren Gnanapragasam, Aurora (CA); Evgenii Krasnikov, Etobicoke (CA); Adrian Leung, Richmond Hill (CA); David Hansen, Calgary (CA)

(73) Assignee: QUALCOMM Incorporated, San Diego, CA (US)

( * ) Notice: Subject to any disclaimer, the term of this patent is extended or adjusted under 35 U.S.C. 154(b) by 22 days.

(21) Appl. No.: 16/591,462

(22) Filed: Oct. 2, 2019

(65) Prior Publication Data
US 2021/0105442 A1    Apr. 8, 2021

(51) Int. Cl.
| | |
|---|---|
| *H04N 7/18* | (2006.01) |
| *H04N 3/14* | (2006.01) |
| *G06N 3/02* | (2006.01) |
| *G06V 20/40* | (2022.01) |
| *G06V 40/20* | (2022.01) |

(52) U.S. Cl.
CPC .............. *H04N 7/188* (2013.01); *G06N 3/02* (2013.01); *G06V 20/46* (2022.01); *G06V 40/23* (2022.01); *H04N 3/1562* (2013.01)

(58) Field of Classification Search
CPC .. H04N 7/188; H04N 3/1562; G06K 9/00744; G06K 9/00342; G06N 3/02
USPC ........................................................ 386/228
See application file for complete search history.

(56) References Cited

U.S. PATENT DOCUMENTS

| | | | |
|---|---|---|---|
| 2007/0217761 A1* | 9/2007 | Chen .................. | H04N 9/79 386/228 |
| 2012/0014659 A1* | 1/2012 | Hugosson .............. | H04N 7/188 386/228 |
| 2012/0057843 A1* | 3/2012 | Otani ................... | G11B 27/105 386/224 |
| 2016/0196852 A1* | 7/2016 | Sievert .............. | G11B 27/3027 386/241 |

(Continued)

FOREIGN PATENT DOCUMENTS

| | | | |
|---|---|---|---|
| CN | 106845411 A | * | 6/2017 |
| WO | 2018089131 A1 | | 5/2018 |

OTHER PUBLICATIONS

Jiang H., et al., "Super SloMo: High Quality Estimation of Multiple Intermediate Frames for Video Interpolation," Computer Vision and Pattern Recognition, Jul. 13, 2018, 12 pages.

(Continued)

*Primary Examiner* — Loi H Tran
(74) *Attorney, Agent, or Firm* — Polsinelli LLP

(57) ABSTRACT

A camera image processor receives frames from an image sensor of the camera. While continuing to receive frames from the image sensor, the camera image processor detecting an action within one or more frames of the received frames, for example using a convolution neural network trained to recognize one or more actions. While continuing to receive frames from the image sensor, the camera image processor captures the one or more frames with the detected action, for example as a still image, or as a slow-motion portion of a video that includes the received frames.

19 Claims, 9 Drawing Sheets

(56) References Cited

U.S. PATENT DOCUMENTS

| | | | |
|---|---|---|---|
| 2018/0300880 A1* | 10/2018 | Fan | G06K 9/4628 |
| 2019/0147279 A1* | 5/2019 | Liu | G06K 9/00993 |
| | | | 382/181 |
| 2019/0325780 A1* | 10/2019 | Kim | G06N 20/00 |
| 2020/0242734 A1* | 7/2020 | Wang | G06K 9/6289 |
| 2020/0366960 A1* | 11/2020 | Quader | H04N 21/4666 |
| 2020/0372992 A1* | 11/2020 | Wu | G16Y 10/80 |

OTHER PUBLICATIONS

Reda F.A., et al., "Unsupervised Video Interpolation Using Cycle Consistency," Computer Vision and Pattern Recognition, Jun. 13, 2019, 10 pages.

Tejero-De-Pablos A., et al., "Summarization of User-Generated Sports Video by Using Deep Action Recognition Features," IEEE Transactions on Multimedia, vol. 20, No. 8, Aug. 2018, pp. 1-13.

Zhu A.Z., et al., "EV-FlowNet: Self-Supervised Optical Flow Estimation for Event-based Cameras," Computer Vision and Pattern Recognition, Aug. 13, 2018, 9 pages.

\* cited by examiner

IMAGE CAPTURE BASED ON ACTION RECOGNITION

FIELD

The present disclosure generally relates to image processing, and more specifically to techniques and systems for identifying a capture event based on action recognition while frames are being received from an image sensor of a camera.

BACKGROUND

A camera is a device that receives light and captures image frames, such as still images or video frames, using an image sensor. Cameras may include processors, such as image signal processors (ISPs), that generally receive one or more image frames and process the one or more image frames. The captured images or videos are generally stored on a physical medium such as film or a computer-readable memory.

Slow-motion video is a video effect in which time appears to be slowed down, where for example playback of a set of video frames is at a lower frame rate (and thus stretched out over a longer period of time) than the frame rate at which capture of the same set of video frames occurred. Slow-motion video playback can be achieved when the video being slowed down is captured at a high frame rate, since those frames are played back at the lower frame rate (e.g., corresponding to a longer period of time) that the frame rate at which they were captured. Slow-motion video playback is sometimes used so that viewers can more clearly see fast movements that might otherwise be difficult or impossible for the human eye to perceive. However, watching an entire video in slow-motion can be tedious to a viewer, as portions of the video in which movements are not fast, or in which nothing interesting is happening, can become unnecessarily drawn out.

SUMMARY

Techniques and systems are described herein for identifying a capture event based on action recognition while frames are being received from an image sensor of a camera. In some examples, the capture event can include selecting one or more of the received frames for photo capture, or selecting a set of one or more frames for slow-motion video playback. For instance, a camera image processor can receive frames from an image sensor of the camera. While continuing to receive frames from the image sensor, the camera image processor can detect an action within one or more frames of the received frames, for example using a convolutional neural network trained to recognize one or more actions. Based on the detected action, and while continuing to receive frames from the image sensor, the camera (e.g., using a processor, an image processor, and/or other component) can capture the one or more frames with the detected action, for example as a still image, and/or can indicate that the one or more frames with the detected action are to be captured and/or played back as a slow-motion portion of a video that includes the received frames.

In one example, a method of processing visual media is provided that includes receiving frames from an image sensor and detecting an action within one or more frames of the received frames. The method also includes capturing the one or more frames with the detected action.

In some cases, the method also includes generating one or more indicators while continuing to receive frames from the image sensor. The one or more indicators identify the one or more frames based on the action having been detected in the one or more frames. In some cases, the method also includes storing a video that includes at least the one or more frames with the detected action such that a portion of the video that is identified based on the one or more indicators is configured for slow-motion playback. In some cases, a frame rate of playback of the portion of the stored video is lower than an image sensor frame rate of the one or more frames as received from the image sensor. In some cases, storing the video includes storing the one or more indicators that identify the one or more frames within video metadata that is stored in association with the video. In some cases, capturing the one or more frames with the detected action includes storing a still image that includes the detected action.

In some cases, the method also includes applying a convolutional neural network (CNN) to the one or more frames. Detecting the action within the one or more frames is performed by the CNN. In some cases, the method also includes generating, using the CNN, a probability that the detected action is within the one or more frames, wherein detecting the action within the one or more frames includes identifying that the probability exceeds a threshold. In some cases, the method also includes downsampling one or more of the one or more frames before applying the CNN to the one or more frames. In some cases, the method also includes dropping one or more of the one or more frames before applying the CNN to the one or more frames.

In another example, an apparatus for processing visual media includes an image sensor, a memory configured to store image data, and a processor implemented in circuitry. The processor is configured to receive frames from an image sensor and detect an action within one or more frames of the received frames. The processor is further configured to capture the one or more frames with the detected action.

In some cases, the processor is further configured to generate one or more indicators while continuing to receive frames from the image sensor. The one or more indicators identify the one or more frames based on the action having been detected in the one or more frames. In some cases, the processor is further configured to store a video that includes at least the one or more frames with the detected action such that a portion of the video that is identified based on the one or more indicators is configured for slow-motion playback. In some cases, a frame rate of playback of the portion of the stored video is lower than an image sensor frame rate of the one or more frames as received from the image sensor. In some cases, storing the video includes storing the one or more indicators that identify the one or more frames within video metadata that is stored in association with the video. In some cases, capturing the one or more frames with the detected action includes storing a still image that includes the detected action.

In some cases, the processor is further configured to apply a convolutional neural network (CNN) to the one or more frames. Detecting the action within the one or more frames is performed by the CNN. In some cases, the processor is further configured to generate, using the CNN, a probability that the detected action is within the one or more frames, wherein detecting the action within the one or more frames includes identifying that the probability exceeds a threshold.

In some cases, the processor is further configured to downsample one or more of the one or more frames before applying the CNN to the one or more frames. In some cases, the processor is further configured to drop one or more of the one or more frames before applying the CNN to the one or more frames.

In another example, a non-transitory computer-readable medium is provided having stored thereon instructions that, when executed by one or more processors, cause the one or more processors to perform operations. The operations include receiving frames from an image sensor and detecting an action within one or more frames of the received frames. The operations also include capturing the one or more frames with the detected action.

In some cases, the operations also include generating one or more indicators while continuing to receive frames from the image sensor. The one or more indicators identify the one or more frames based on the action having been detected in the one or more frames. In some cases, the operations also include storing a video that includes at least the one or more frames with the detected action such that a portion of the video that is identified based on the one or more indicators is configured for slow-motion playback. In some cases, a frame rate of playback of the portion of the stored video is lower than an image sensor frame rate of the one or more frames as received from the image sensor. In some cases, storing the video includes storing the one or more indicators that identify the one or more frames within video metadata that is stored in association with the video. In some cases, capturing the one or more frames with the detected action includes storing a still image that includes the detected action.

In some cases, the operations also include applying a convolutional neural network (CNN) to the one or more frames. Detecting the action within the one or more frames is performed by the CNN. In some cases, the operations also include generating, using the CNN, a probability that the detected action is within the one or more frames, wherein detecting the action within the one or more frames includes identifying that the probability exceeds a threshold. In some cases, the operations also include downsampling one or more of the one or more frames before applying the CNN to the one or more frames. In some cases, the operations also include dropping one or more of the one or more frames before applying the CNN to the one or more frames.

In another example, an apparatus for processing visual media is provided. The apparatus includes means for receiving frames from an image sensor and means for detecting an action within one or more frames of the received frames. The apparatus further includes means for capturing the one or more frames with the detected action.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Figure 1:
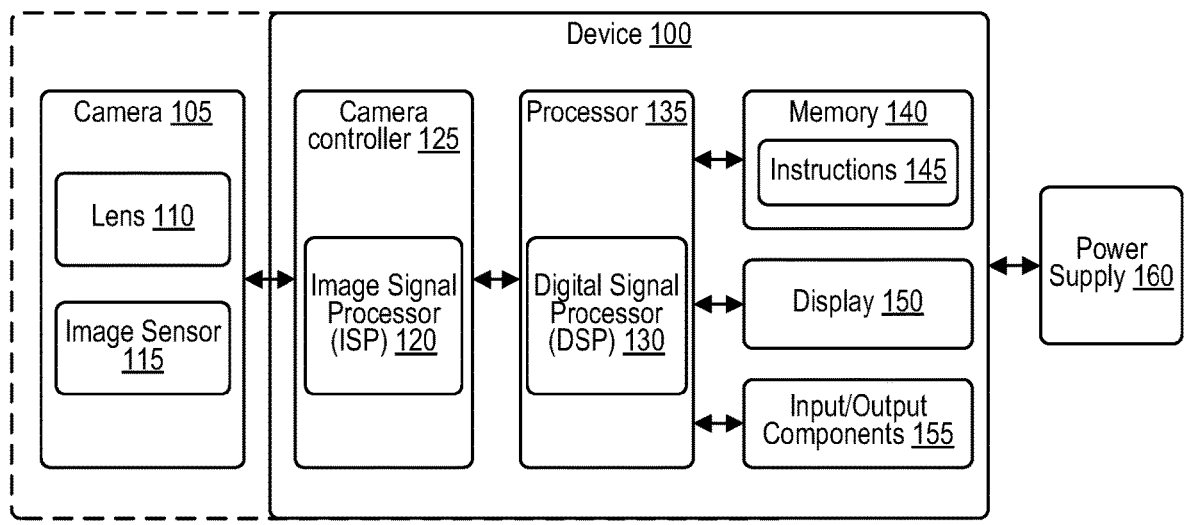
FIG. 1 is a diagram illustrating an architecture of a device.

FIG. 1 illustrates an architecture of a device 100. The device 100 of FIG. 1 includes a camera controller 125 with an image signal processor (ISP) 120, a processor 135 with a digital signal processor (DSP) 130, a memory 140 storing instructions 145, a display 150, and input/output (I/O) components 155. The device 100 may be connected to a power supply 160.

The camera controller 125 may receive image data from a camera 105, optionally from an image sensor 115 of the camera 105. In particular, the camera 105 of FIG. 1 may include a lens 110 that receives light from a scene that includes a subject. The lens 110 directs the light to an image sensor 115 with a pixel array. The image sensor 115 outputs frames to the device 100 (e.g., to one or more processors of the device 100) in response to the image sensor 115 receiving light for each of the frames. The device 100 receives the frames from the image sensor 115 and processes the frames via one or more processors. The camera 105 may either be a part of the device 100, or may be separate from the device 100.

The device 100 of FIG. 1 may include one or more processors. The one or more processors of the device 110 may include the camera controller 125, the image signal processor (ISP) 120, the processor 135, the digital signal processor (DSP) 130, or a combination thereof. The ISP 120 and/or the DSP 130 may process the frames from the image sensor 115. The ISP 120 and/or the DSP 130 may generate visual media that maybe encoded using an image and/or video encoder. The visual media may include one or more processed still images and/or one or more videos that include video frames based on the frames from the image sensor 115. The device 100 may store the visual media as one or more files on the memory 140. The memory 140 may include one or more non-transitory computer-readable storage medium components, each of which may be any type of memory or non-transitory computer-readable storage medium discussed with respect to the memory 915 of FIG. 9. In some cases, one or more of the one or more non-transitory computer-readable storage medium components of the memory 140 and may optionally be removable. Illustrative examples of memory 140 may include a secure digital (SD) card, a micro SD card, a flash memory component, a hard drive, random access memory (RAM) such as dynamic RAM (DRAM) or static RAM (SRAM), another storage medium, or some combination thereof.

Figure 4:
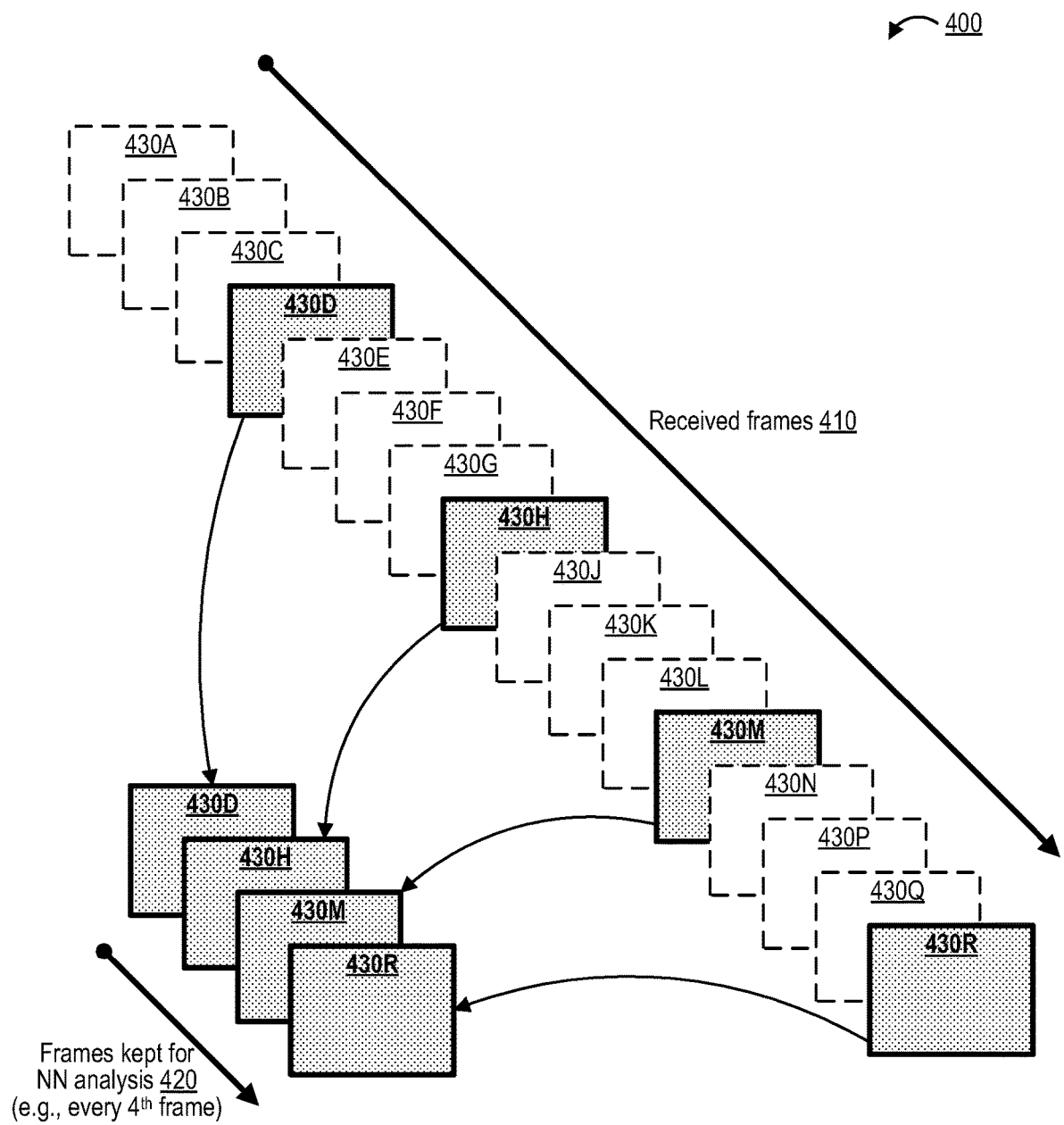
FIG. 4 is a diagram illustrating frame skipping of received frames.

A image sensor frame rate is a rate or frequency at which frames are recorded by and/or received from an image sensor of a camera. In some cases, an image sensor frame rate may be referred to as a capture frame rate, a recording frame rate, a camera frame rate, or a frame receipt frame rate. A playback frame rate is a rate or frequency at which frames are played or output during playback of a video, after the video has been captured, generated, encoded, and/or stored. Both image sensor frame rates and playback frame rates are examples of frame rates, which are often measured in frames per second (fps). Different cameras and different image sensors may be capable of different image sensor frame rates. Some cameras may include a setting that allows a user to select one of several possible image sensor frame rates at which to record. Some video types may be played or output at a playback frame rate of 24 fps, such as some television (TV), web-based video, film, among others. Some video types may be played or output at 30 fps, such as live TV and sports, among others. Some video types may be played or output 60 fps, such as video games. Some cameras that are used for film recording may record at an image sensor frame rate of 24 fps intentionally even if the image sensor and/or camera is capable of recording at a higher frame rate. Other cameras may record a higher number of frames per second (e.g., 30, 40, 50, 60, 70, 80, 90, 100, 240, 480, 960, or other fps) and therefore have a higher image sensor frame rate. When an image sensor frame rate of a video is higher than the intended playback frame rate of the video, the computer or other video playback system may in some cases drop or skip some frames as illustrated in FIG. 4 so that the intended playback frame rate is reached without distorting the speed of events occurring in the video. If an image sensor frame rate of a video is different than the playback frame rate of the video, the speed of events depicted in the video during playback of the video may appear faster or slower than the speed at which those events actually took place in the real world, depending on whether the playback frame rate is higher or lower than the image sensor frame rate.

If the image sensor frame rate of a camera exceeds the playback frame rate of a video, and frames are not dropped or skipped to compensate for this difference, then events depicted in the video may appear to occur in slow-motion during playback of the video. Slow-motion is a video playback effect in which time in the video appears to be slowed down compared to time in the real world. For example, if an image sensor frame rate of a video is 960 fps, then each second of the video includes 960 frames. If those 960 frames are played back at a playback frame rate of 30 fps, then playing back all 960 frames takes 32 seconds, since 960/30=32. If the camera is recording a real-world event at the high frame rate of 960 fps, then effectively stretching out each second of that event into 32 seconds gives the appearance of time in the video being slowed down compared to time in the real world. High image sensor frame rates (e.g., 960 fps, 480 fps, 240 fps, 120 fps, 60 fps, or other fps values above 24 or 30) are preferred for slow motion playback to retain fluid motion during playback. While video captured at a low image sensor frame rate, such as 30 fps or 24 fps, may still be played back at an even lower playback frame rate, such as 15 fps or 10 fps, to produce slow motion playback, motion may appear jerky at frame rates lower than 24 fps. Viewing videos at playback frame rates of 16 fps or below may in some cases cause headaches in viewers.

Slow-motion video playback is sometimes used so that viewers can more clearly see actions with fast movements that might otherwise be difficult or impossible for the human eye to perceive fully or in detail, such as wings of a bird flapping during flight, an athlete or animal running, an athlete or animal jumping, an athlete throwing a projectile, an athlete striking an object, a projectile being fired from a firearm, energy released during an explosion, or similar actions. Slow-motion video can enhance a viewer's enjoyment and understanding of certain interesting actions, especially those involving motions that might occur very quickly when viewed in real-time. However, watching a long video entirely in slow-motion when only a small segment of the video includes interesting actions can be tedious to a viewer. For example, portions of the slow-motion video that do not depict any interesting actions would be slowed down as much as portions depicting interesting actions, and the uninteresting portions (e.g., that do not include one or more interesting actions) of the slow-motion video can end up occupying so much time that the viewer loses interest long before any interesting actions are displayed in the video.

In some cases, a user of the camera may press a record button (also sometimes referred to as a capture button or a shutter button), or press a high frame rate (HFR) record button, just before an interesting action occurs. Such a solution is impractical in many situations, as the user may not know when the interesting action will occur. Even if the user knows that the interesting action will occur, the limits of human reflexes and hand-eye coordination can prevent the user from pressing the record button (or HFR record button) at the correct time. Pressing the record button at an incorrect time can result in a failure to capture the interesting action in its entirety at the HFR, can result in capture of the interesting action at the HFR as well as additional unnecessary capture of uninteresting portions of the video at the HFR, and/or can result in some other unwanted action. Capturing uninteresting portions of the video at the HFR can waste space and/or slow-motion playback time, and/or can require laborious manual editing to remove frames from the uninteresting portions of video.

In some cases, a long segment of video that includes an interesting action somewhere within the video frames can intentionally be captured at a HFR. A user can then, through laborious manual editing, remove frames from uninteresting portions of video so that such portions are played back without slow-motion. Frames (or removing fewer frames) in portions of the video with interesting actions can be retained, so that the portions with interesting actions can be played back in slow-motion. Alternately, the one or more processors of the camera may automatically select a portion of the video for slow-motion playback, and may automatically remove frames from unselected portions of the video that are not in the selected portions so that the unselected portions are played back without slow-motion. For example, the one or more processors may select the portion of the video that should be played back in slow-motion to be a middle portion of a video, which is not optimal because interesting actions do not always occur in the middle of a video.

In some cases, the one or more processors may select the portion of the video that should be in slow-motion to be a portion of a video in which motion is detected, or in which motion that is faster than a speed threshold is detected, which also may not be optimal because motion (or even fast motion) may not always be a reliable indicator of an interesting action. Motion detected in a background of a video, such as cars driving in a background of a video, can trigger slow motion in such cases even when nothing interesting is happening in the foreground of the video. As another example, if a video is captured of an athlete running for a long stretch and then jumping, the running might feature enough motion to trigger slow-motion, even though the jumping may be considered the more interesting action.

Systems and techniques are described herein for providing an improved process for identifying portions of video that should be played back in slow-motion by identifying interesting actions within frames of the video. For example, a system and/or process can use a neural network (NN), such as a three-dimensional (3D) convolutional neural network (CNN) to identify interesting actions within frames of a video. The NN may be trained using video that includes actions which have been previously identified as interesting or uninteresting. The systems and techniques may use the NN to identify actions and trigger one or a number of capture events based on identification of the actions. For example, the systems and techniques may be used to capture videos in which one or more interesting actions are depicted in such a way as to ensure that the sections of video with interesting actions may be played back in slow motion. The systems and techniques may be used to capture one or more images that depict one or more interesting actions. The systems and techniques may be used to generate one or more videos that include one or more interesting actions (e.g., highlight reels), optionally with some predefined amount of uninteresting video retained around each interesting action for context. The systems and techniques described herein, and the various capture events they may be used for, are discussed in more detail below.

Figure 2:
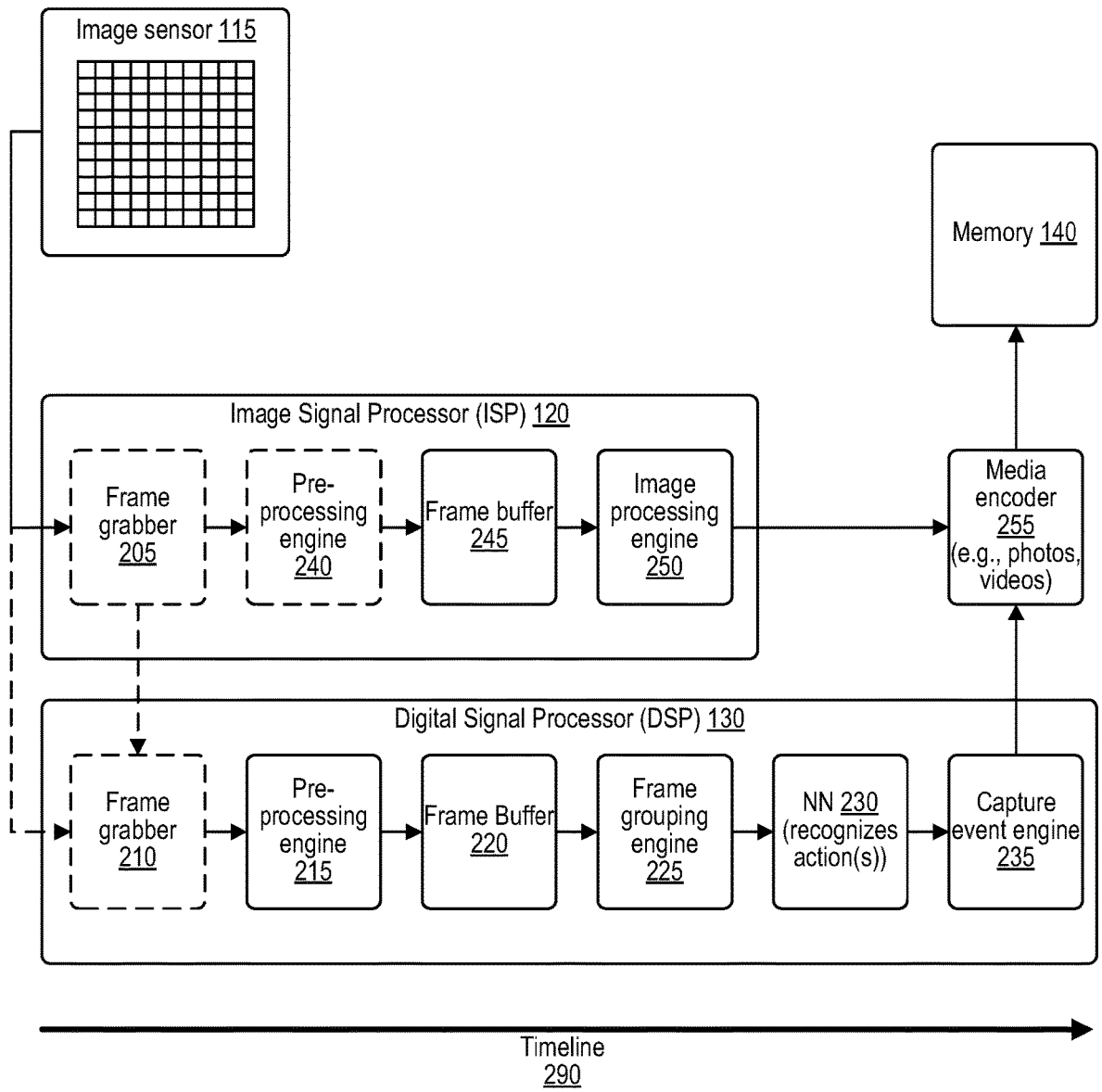
FIG. 2 is a diagram illustrating an example of a system performing operations for implementing action recognition and triggering a capture event.

FIG. 2 is a diagram illustrating a system 200 for implementing action recognition and triggering a capture event. The components of the system 200 are illustrated in the context of the image sensor 115, the ISP 120, the DSP 130, and the storage medium 140. A timeline 290 is illustrated along the bottom of FIG. 2, which illustrates that time generally progresses from left to right as illustrated in the operations as performed by the system 200 of FIG. 2. In some cases, some of the components of the system 200 and/or operations performed by the components may occur in parallel or out of order relative to the order shown in FIG. 2.

The image sensor 115 (or another component of the camera 105) may send frame data to the ISP 120 and/or to the DSP 130, which then receive the frame data. In some cases, a the ISP 120 receives the frame data from the image sensor 115 (e.g., at frame grabber 205), and the DSP 130 also receives the frame data from the image sensor 115 (e.g., at frame grabber 210). In some cases, the ISP 120 receives the frame data from the image sensor 115 (e.g., at frame grabber 205), and ISP 120 sends the frame data that it receives from the image sensor 115 to the DSP 130 (e.g., to the frame grabber 210). In some cases, the frame data may be received as complete frames, while in other cases the frame data may be received as one or more pixels at a time. In some cases, frame data may be received one or more lines (e.g., rows and/or columns) of pixels at a time.

The frame grabber 210 and the frame grabber 240 are optional components. When present, the frame grabber 205 of the ISP 120 and/or the frame grabber 210 of the DSP 130 may be used to parse or otherwise recognize each data unit of frame data received from the camera 105 (e.g., from the image sensor 115) as belonging to one particular frame or another. Frame data received at the ISP 120, whether via frame grabber 205 or otherwise, can optionally be pre-processed via a pre-processing engine 240 and can be sent to a frame buffer 245 of the ISP 120 for temporary storage. The pre-processing engine 240 may perform, for example, de-mosaicing of frame data from a color filter (e.g., Bayer filter) domain into a different color domain, such as a red green blue (RGB) color space, a cyan magenta yellow (CMY) color space, a cyan magenta yellow key/black (CMYK) color space, a CYGM color space, a red green blue emerald (RGBE) color space, a luminance (Y) chroma (U) chrome (V) (YUV) color space, or any combination thereof. The pre-processing engine 240 may in some cases alternately or additionally perform color space conversion between any of the color spaces discussed above with respect to de-mosaicing, black level adjustment, bad pixel correction, white balance adjustment, color correction, gamma correction, edge enhancement, contrast enhancement, chroma suppression, resizing, rotation, cropping, focus adjustment, exposure adjustment, filtering, lens shading, lens roll-off correction, other image processing algorithms, or any combination thereof. The DSP 130 includes a pre-processing engine 215 that can perform any of the processes discussed above with respect to the pre-processing engine 240 of the ISP 120, and that can also perform additional tasks, such as frame skipping as illustrated in FIG. 4, or frame downsampling as illustrated in FIG. 5.

The ISP 120 and the DSP 130 may process the frame data received from the image sensor 115 in parallel. The DSP 130's processing provides a neural network 230 with processed frame data that the neural network 230 uses for action recognition. The processed frame data that is fed to the neural network 230 by the DSP 130 may be processed via downsampling and/or frame skipping for quick (e.g., near real-time) action recognition analysis by the neural network 230. Meanwhile, the ISP 120 processes high-quality frame data that the ISP 120 and/or media encoder 255 use to ultimately generate a media file based on the one or more actions recognized through action recognition by the neural network 230.

As mentioned above, the pre-processing engine 215 of the DSP 130 may process the frame data received by the DSP 130 a number of ways, including via de-mosaicing, color space conversion, black level adjustment, bad pixel correction, white balance adjustment, color correction, gamma correction, edge enhancement, contrast enhancement, chroma suppression, resizing, rotation, cropping, focus adjustment, exposure adjustment, filtering, lens shading, lens roll-off correction, frame skipping, frame downsampling, or some combination thereof. Frame skipping may also be referred to as dropping of frames, and is illustrated in FIG. 4. As described with reference to FIG. 4 below, frame skipping may reduce the number of frames that the DSP 130 provides to the NN 230 as an input. For example, if a HFR such as 120 FPS is used as the image sensor frame rate at the camera 105, motion across frames is generally still fluid even if frames are periodically skipped or dropped, resulting in a set of frames at a lower frame rate such as 30 FPS. Because motion across frames is still generally fluid even in a lower frame rate resulting from frame skipping, the NN 230 may still recognize actions even if periodic frames are dropped through frame skipping.

Figure 5:
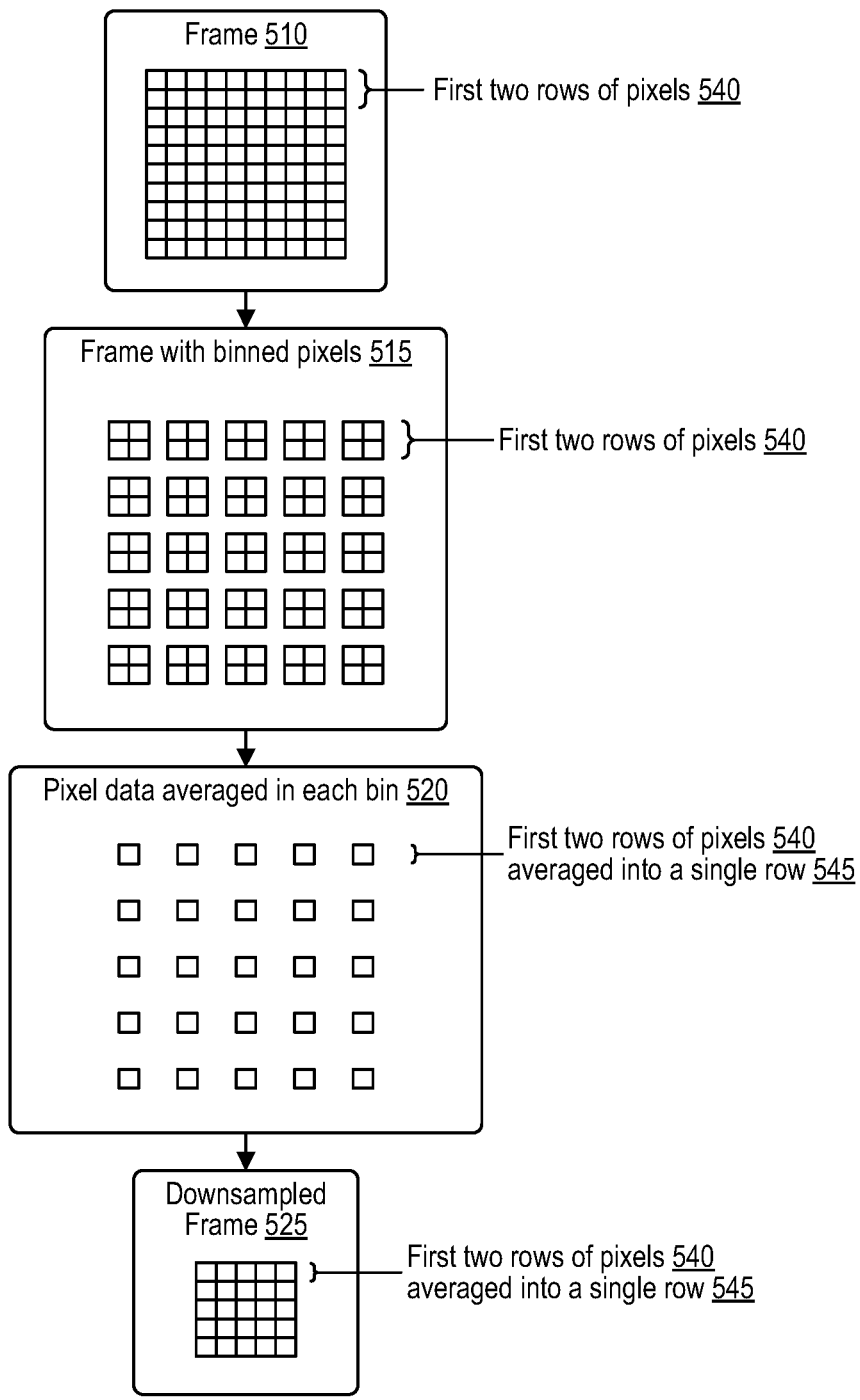
FIG. 5 is a diagram illustrating downsampling of received frames.

In some cases, the pre-processing performed by the pre-processing engine 215 may include downsampling frames as illustrated in FIG. 5. For instance, if the image sensor 115 outputs frames with a high resolution to the ISP 120 and/or to the DSP 130, such as frames with a 50 megapixel resolution, the frames may generally still be detailed enough for the NN 230 to recognize actions depicted therein even after being downsampled to a lower resolution, such as a 480p resolution, a 280p resolution, or even lower. In some cases, the DSP 130 may perform frame skipping and then perform frame downsampling in order to avoid unnecessary downsampling of frames that will be skipped during frame skipping. In some cases, frames may be skipped after the frames are downsampled.

As noted above, the DSP 130 (e.g., the frame grabber 210 of the DSP 130) may receive frames on a frame-by-frame basis, in which case each frame is received by the DSP 130 when all of the frame data for the frame has been received. The DSP 130 (e.g., the frame grabber 210) may alternately receive frames on a line-by-line basis. For instance, the DSP 130 may receive frame data for a frame one or more rows of pixels, or one or more columns of pixels, at a time. The DSP 130 (e.g., the frame grabber 210) may alternately receive frame data for a frame on a pixel-by-pixel basis, meaning that the DSP 130 receives one or more pixels of frame data at a time.

If the DSP 130 receives frame data on a line-by-line basis or on a pixel-by-pixel basis, certain pre-processing functions (e.g., downsampling and/or frame dropping) may begin for a frame when the DSP 130 has received a portion of the frame data for the frame and/or before the DSP 130 receives the entirety of the frame data for the frame. In one illustrative example, the pre-processing engine 215 of the DSP 130 may begin downsampling a frame as soon as two lines of frame data for the frame have been received by the DSP 130, as discussed further with respect to FIG. 5.

In some cases, frame skipping of a particular frame can occur before frame data for the frame is received at the DSP 130. For example, the pre-processing engine 215 of the DSP 130 may be configured with settings indicating that every $N^{th}$ frame should be skipped, and that the remaining frames (other than every $N^{th}$ frame) are to be selected for use as input to the NN 230. In such an example, the DSP 130 may ignore frame data corresponding to every $N^{th}$ frame. In another example, the pre-processing engine 215 of the DSP 130 may be configured with settings indicating that every $N^{th}$ frame should be selected for use as input to the NN 230, and that the remaining frames (other than every $N^{th}$ frame) are to be skipped. In such an example, the DSP 130 may ignore frame data corresponding to any frame other than every $N^{th}$ frame. In the context of these frame skipping examples, N may be any positive integer, such as 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or any other suitable integer greater than 0.

A frame buffer 220 of the DSP 130 may store frames that are received from the image sensor 115. In some implementations, the frame buffer 220 may store frames after the pre-processing engine 215 has pre-processed the frames. For instance, frames that have been selected for use as input to the NN 230 can be stored and any dropped frames may not be stored in the frame buffer 220. In such implementations, frames stored in the frame buffer 220 may optionally already be downsampled via the pre-processing engine 215, certain frames may have already been dropped or skipped via frame skipping via the pre-processing engine 215, and/or other pre-processing operations discussed above may have already been performed. Storage of the frames in the frame buffer 220 allows the NN 230 to process frames to detect actions even while the image sensor 115 continues to record frames and/or frame data continues to be received at the DSP 130 from the image sensor 115. In some cases, the frame buffer 220 may include (and may be referred to as) a tightly-coupled memory (TCM), an L1 cache, an L2 cache, random access memory (RAM) (e.g., RAM 925 shown in FIG. 9), static RAM (SRAM), some other type of local memory (e.g., memory 915 shown in FIG. 9), or any combination thereof. In some cases, the frame buffer 220 may include a locking functionality, such as locked caching, that restricts write access based on time and/or based on a component attempting to write, for example so that write access to at least a portion of the frame buffer 220 can be restricted while the NN 230 is analyzing the frames and/or can be restricted so that only the DSP 130 has write access. In some cases, the frame buffer 220 may store frames before pre-processing 215 instead of, or in addition to, storing frames after pre-processing 215. As discussed further below, the ISP 120 may also include a frame buffer 245 that may include any of the components and/or functionality discussed above with respect to the frame buffer 220 of the DSP 130.

Figure 3:
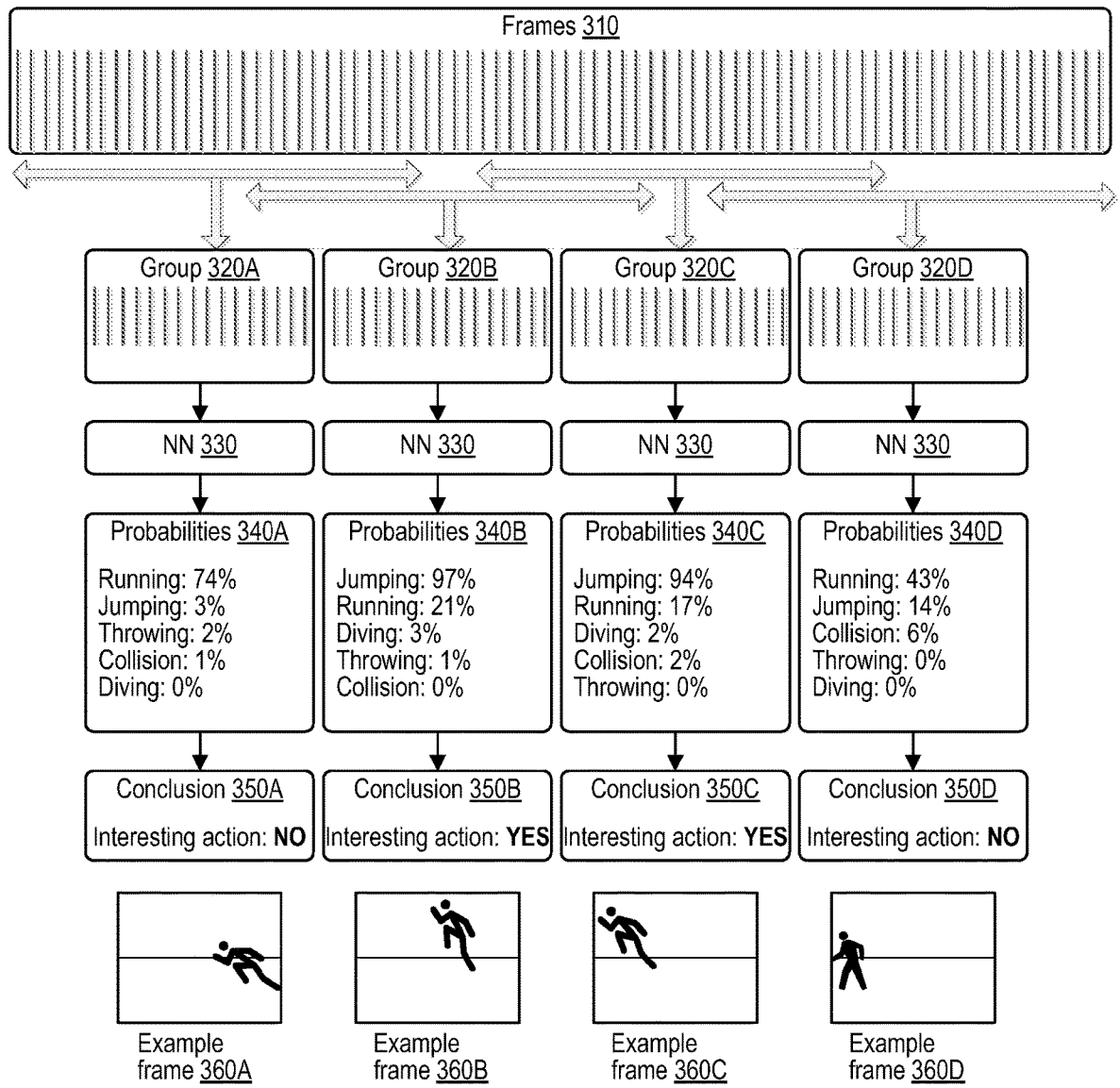
FIG. 3 is a diagram illustrating grouping of frames and analysis of grouped frames.

The frames from the frame buffer 220 (or received by the frame grabber 210 and/or processed by the pre-processing engine 215) are optionally grouped by a frame grouping engine 225 into groups of frames, with each group having one or more frames. A group of frames may include G frames, where G is a positive integer such as 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or any other suitable integer greater than 0. In one illustrative example, a group of frames may include 32 frames. The frame grouping is illustrated in FIG. 3. In some cases, different groups of frames may include a different number of frames. For example, a first group of frames may have G number of frames, while a second group of frames may have H number of frames, where H is a positive integer such as 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or any other suitable integer greater than 0 and different from G.

Each group of G frames is then input to the NN 230, and the NN 230 determines probabilities that the group of G frames depicts an action. Inclusion of more than one frame in the group G allows the NN 230 to recognize actions that are easier to recognize through recognition of movement, such as recognition of an individual walking or running or dancing based on recognition of the individual's leg movements. Some actions may be recognizable by the NN 230 even when the group G only includes a single frame, such as recognition of an individual jumping based on recognition that the individual is not touching the ground. In some examples, the NN 230 may be convolutional neural network (CNN), and optionally may be a three-dimensional (3D) CNN. In some examples, the NN 230 may be a time-delay neural network (TDNN), and optionally may be a three-dimensional (3D) TDNN. In some examples, the NN 230 may be probabilistic neural network (PNN), and optionally may be a three-dimensional (3D) PNN. The layer design and the training of the NN 230 may be optimized produce its conclusion 350 with low latency while frames are still being received from the image sensor 115, to allow the next set of frames to be quickly input to the NN 230.

The NN 230 may be trained to recognize one or more actions. These actions may be previously defined or previously identified actions. The NN 230 may be previously trained using one or more training videos (e.g., video footage clips) as input, where each training video includes one or more frames. Labels may be previously added to each training video (e.g., added by a person or automatically added), which classify whether the training video or whether one or more frames of the training video includes one or more of the previously defined actions. Using the one or more training videos and the labels, the parameters (e.g., weights, biases, and/or other parameters) of the NN 230 can be tuned using backpropagation techniques, thus training the NN 230 to detect similar actions when input video is processed by the NN 230 during inference (or run-time). For example, during training, the NN 230 may receive a training video as input, and may provide an output indicating a likelihood (e.g., a probability) of whether the video includes a defined action. The previously determined labels may be compared with the output from the NN 230 to determine a loss or error associated with the actual outputs, if applicable. The loss may be based on any suitable loss function, such as a using mean squared error (MSE) function, a mean absolute error (MAE) function, a Huber loss function, a log cosh loss function, a quantile loss function, a log loss function, an exponential loss function, a focal loss function, a cross-entropy loss function, a hinge loss functions, a Kullback-Liebler (KL) divergence loss function, any suitable combination thereof, and/or other loss function.

Using the determined loss, backpropagation may be used to determine whether parameters (e.g., weights, biases, etc.) of the NN 230 need to be adjusted in order to improve the accuracy by reducing the error to be within a certain threshold error or to be within a threshold similarity to the corresponding label. For example, the internal machine learning parameters can be adjusted (e.g., by modifying the weights and/or other parameters associated with various neurons or layers), which will effectively change the output generated by the NN 230 when another input video is received (training video or otherwise), and thus will reduce the overall loss.

Once the parameters (e.g., the weights and/or other parameters of the hidden layers) are adjusted based on the loss, another training video and a corresponding label can be input to the NN 230. The NN 230 will then generate another output based on training video, and the loss associated with the new training video will be determined. The loss associated with the new training video will again be used to determine how much the parameters of the NN 230 need to be adjusted to further increase its output accuracy. The loss determination and backpropagation processes can be repeated for several iterations (which may be referred to as epochs) to improve the accuracy of the NN 230 until a predicted output is generated that is below the threshold error or within the threshold similarity of the labels. Operations of the NN 230 are illustrated further in FIG. 3.

The defined actions the NN 230 may be trained to detect or identify may include, for example, a person or animal running, a person or animal jumping, a person or animal throwing an object (e.g., an athlete throwing a ball), a person or animal colliding with an object (e.g., an athlete catching a ball), a person or animal colliding with one or more other a persons or animals (e.g., one athlete tackling another athlete), an object held by a person or animal colliding with another object (e.g., a baseball bat held by a baseball player colliding with a baseball), a particular acrobatic maneuver by a person or animal (e.g., a front flip, a back flip, a barrel roll, a twirl, another acrobatic maneuver, or a combination thereof), a person or animal diving into a liquid, a person or animal or object entering into a liquid, a collision of one or more objects (e.g., an automobile collision, a projectile hitting a wall or other object), another defined action, or some combination thereof.

If the NN 230 detects that at least one of the one or more defined actions that the NN 230 is trained to detect are depicted within a group of frames fed to the NN 230 by the frame grouping engine 225, then a capture event engine 235 may execute a capture event. The capture event engine 235 executing a capture event may, in some cases, include the capture event engine 235 generating one or more indicators identifying one or more groups of frames (that include G frames) in which the NN 230 has detected one or more of the defined actions. In one illustrative example, the one or more indicators may, for example, identify timestamps that identify a time associated with capture and/or playback of the first frame and the last frame of the one or more groups of frames in which one or more actions have been detected by the NN 230.

The one or more indicators may include relative timestamps that may be relative to a particular frame and/or a particular point in time within the received frames, the frame or point in time associated with =receipt of the frame at the device 100 from the image sensor 115 and/or playback of the frame in an encoded video. For example, the indicators may include timestamps indicating that an action is present in one or more groups of frames that start 3.2 seconds after the start of receipt of frames at the device 100 from the image sensor 115 and/or playback of the video, and that end 4.1 seconds after the start of receipt of frames at the device 100 from the image sensor 115 and/or playback of the video. In another example, the indicators may include timestamps indicating that an action is detected in one or more groups of frames that start 1.2 seconds after the end of a previous group of frames in which an action was also detected, and that end 2.9 seconds after the end of the previous group of frames. The one or more indicators may include absolute timestamps that may, for example, indicate a date and time of receipt of a particular frame at the device 100 from the image sensor 115. For example, the indicators may include timestamps indicating that an action is present in one or more groups of frames, with a frame corresponding to the start of the action being received at the device 100 from the image sensor 115 on Sep. 25, 2019 at 3:23:05, and with a frame corresponding to the end of the action received at the device 100 from the image sensor 115 on Sep. 25, 2019 at 3:23:07. In another example, the indicators may include timestamps indicating that an action is detected in one or more groups of frames that start 3.2 second after playback begins, and that end 4.1 seconds after playback begins. In some cases, instead of including both a start timestamp and an end timestamp, the indicators may include a single timestamp indicating a start or end or middle of one or more groups of frames in which an action is detected, optionally as well as a length of time corresponding to a duration of the one or more groups of frames.

The one or more indicators may alternately or additionally identify frame numbers or frame counts instead of, or in addition to, timestamps. That is, the one or more indicators may identify the first frame and the last frame of one or more groups of frames that include one or more actions detected by the NN 230. An indicator may identify a frame count relative to receipt of a particular frame at the device 100 from the image sensor 115 (e.g., first frame of a recording) and/or playback of a particular frame in an encoded video (e.g., first frame of the video). For example, an indicator may identify that one or more groups of frames in which an action is detected start at the $120^{th}$ frame in a particular recording session (or the $120^{th}$ frame played back in the current playback session) and end at the $140^{th}$ frame in the recording session (or the $140^{th}$ frame played back in the current playback session). The indicators may identify relative frames relative to other events, for example identifying that one or more groups of frames in which an action is detected start 230 frames after an end of a previous group of frames in which an action was detected, and end 280 frames after the end of the previous group of frames in which the action was detected. In another illustrative example, the one or more indicators may identify a frame number and/or a timestamp of the first frame or the last frame or the middle frame in the group of frames, and may also identify a length (in time) or a number of frames G of the group, which can be used to identify frames within the group. In another illustrative example, the one or more indicators may identify a single timestamp and/or frame number corresponding to a first frame, a middle frame, or a last frame, and the length (in time) or the number of frames G in the group may be previously known by other components of the device 100 (e.g., by the capture event engine 235, the media encoder 255, etc.). For instance, the frames within a group may be identifiable based on each of the groups having a pre-set number of frames G as discussed with respect to the frame grouping engine 225. In some cases, different groups of frames may include a different number of frames. For example, a first group of frames may have G number of frames, while a second group of frames may have H number of frames.

In some examples, multiple consecutive and/or overlapping groups of frames can include actions detected by the NN 230, which can indicate that a detected action spans more time than is represented in a single group of frames. In such examples, indicators within (e.g., in the "middle" of or otherwise between the start and end of) the multiple consecutive and/or overlapping groups of frames may be deleted or omitted so that the first frame and/or the last frame of the multiple consecutive and/or overlapping groups of frames are identified using indicators (e.g., timestamps and/or frame numbers). Deleting or omitting indicators within the multiple consecutive and/or overlapping groups of frames allows the NN 230 to detect, and the capture event engine 235 to generate indicator(s) identifying, sequences of frames with detected actions that span different durations of time and/or different numbers of frames. Such a scenario is illustrated with respect to the first detected action 860 and the second detected action 870 of FIG. 8 (described in more detail below).

Generation of the one or more indicators for one or more groups of frames by the capture event engine 235 may be one type of capture event. Another type of capture event may include triggering the capture, generation, encoding, and/or storage of one or more still images or short video clips that depict the detected action by including at least a subset of frames from the one or more groups of frames within which the action was detected. In one example, a still image may be generated based on at least one frame selected from a group of frames within which the action was detected, and/or optionally selected from one or more additional frames that were dropped or skipped during frame skipping performed by the pre-processing engine 215 of the DSP 130. In another example, one or more frames may be selected from the group of frames so that one or more still images and/or video clips may be generated based on the selected one or more frames. For instance, the first M frames from a group of G frames may be selected, the last M frames may be selected, or the middle M frames may be selected. In some cases, the one or more frames for which the NN 230 outputs the highest probability of depicting a defined action, and optionally M frames around (e.g., before and/or after) each frame(s) with the highest probability, may be selected. In such examples, M may be a positive integer such as 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, or any other suitable integer greater than 0. The M frames that are selected may optionally include frames that were dropped or skipped during frame skipping performed by the pre-processing engine 215 of the DSP 130.

The capture event engine 235 may send information corresponding to the capture event(s) to a media encoder 255. The media encoder 255 may generate and encode one or more media files based on the information from the capture event engine 235 and using frames processed by the ISP 120. The one or more media files can include one or more videos, one or more still images, or some combination thereof.

The ISP 120 may process frames in parallel with the operations of the DSP 130 as previously discussed. Like the frame grabber 210 of the DSP 130, the frame grabber 205 of the ISP 120 may be used to parse or otherwise recognize each data unit of the frame data received by the ISP 120 from the image sensor 114 as belonging to one particular frame or another, and may do so frame-by-frame, line-by-line, or pixel-by-pixel. The description of the frame grabber 210 of the DSP 130 may likewise apply to the frame grabber 205 of the ISP 120. Once the frames are received by the ISP 120, the frames may be temporarily stored in a frame buffer 245 of the ISP 120. The description of the frame buffer 220 of the DSP 130 may likewise apply to the frame buffer 245 of the ISP 120.

An image processing engine 250 of the ISP 120 may apply one or more image processing algorithms to the frames stored in the frame buffer 245. For example, the one or more image processing algorithms may include demosaicing, color space conversion, black level adjustment, bad pixel correction, white balance adjustment, color correction, gamma correction, edge enhancement, contrast enhancement, chroma suppression, resizing, rotation, cropping, focus adjustment, exposure adjustment, filtering, lens shading, lens roll-off correction, format conversions, compression, downsampling, upsampling, red eye correction, motion blur correction, sharpening, brightness correction, contrast correction, frame skipping, other image processing algorithms, or any combination thereof. While the frame buffer 245 is illustrated as storing frames before (to the left of relative to the timeline 290) processing of the frames by the image processing engine 250, the frame buffer 245 (or an additional frame buffer) may alternately or additionally store frames after (to the right of relative to the timeline 290) processing of the frames by the image processing engine 250. In some cases, the ISP 120 may include multiple frame buffers, such as a frame buffer in a color filter space (e.g., Bayer filter space) and a frame buffer in a different color space (e.g., RGB, YUV, CMYK, or some combination thereof). In some cases, the frame buffer 245 (and/or any additional frame buffers) may be included elsewhere in the device 100 outside of the ISP 120.

The media encoder 255 may encode the media output by the ISP 120, which the media encoder 255 may then store in the memory 140. While the media encoder 255 is illustrated as part of neither the ISP 120 nor the DSP 130, in some cases the media encoder 255 may be part of, or run on, one or both of the ISP 120 and the DSP 130. The media encoder 255 may alternately be part of, or run on, an alternate one or more processors of the device 100 other than the ISP 120 and/or DSP 130. Storage of the media in the memory 140 may be more permanent (less temporary) than the temporary storage of the frame buffer 245 of the ISP 120 and/or of the frame buffer 220 of the DSP 130. The media encoded and/or stored in memory 140 by the media encoder 255 may include one or more videos and/or one or more still images. For example, the media encoder 255 may obtain (e.g., receive, retrieve, or otherwise obtain) high-quality frames from the frame buffer 245 (which may have undergone image processing by the image processing engine 250) rather than lower-quality frames fed to the NN 230 by the DSP 130. As noted above, the lower-quality frames may include frames after frame skipping and/or downsampling performed by the pre-processing engine 215. The media encoder 255 generates one or more media files (e.g., one or more videos and/or one or more still images) that may be stored in a more permanent fashion in the memory 140. The one or more stored videos and/or still images output by the media encoder 255 may be displayable by a display device such as the display 150 or a display of a separate device other than the device 100. In some cases, a processor such as the processor 135 or another processor 910 of a separate device may be used to decode the one or more stored videos and/or still images output by the media encoder 255, enabling the one or more stored videos and/or still images to be displayed. In some cases, the media encoded and/or stored in memory 140 by the media encoder 255 may be included in a container file, a container bundle/archive of files, or another container format.

In some cases, one or more of the operations illustrated in FIG. 2 as being performed by components of the ISP 120 may instead or additionally be performed by components of the DSP 130 or other part of a device 100. Likewise, in some cases, one or more of the operations that are illustrated in FIG. 2 as performed by components of the DSP 130 may instead or additionally be performed by components of the ISP 120 or other part of a device 100. In some cases, the separation between the ISP 120 and DSP 130 is not present, and the operations that are illustrated in FIG. 2 as being performed by components of the ISP 120 and/or components of the DSP 130 may all be performed by one processor 910 (or multiple processors), which may be an ISP 120, a DSP 130, any other type of processor 910 discussed with respect to FIG. 9, or any combination thereof. In some cases, one or more of the operations that are illustrated in FIG. 2 as being performed by components of the ISP 120 and/or components of the DSP 130 may be performed at the image sensor 115. In some cases, operations discussed herein as performed by components of the image sensor 115 may instead be performed by be an ISP 120, a DSP 130, any other type of processor 910 discussed with respect to FIG. 9, or some combination thereof.

The components of the system 200 can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein. While the system 200 is shown to include certain components, one of ordinary skill will appreciate that the machine learning system 200 can include more or fewer components than those shown in FIG. 2. For example, the system 200 may also include, in some instances, one or more memory devices (e.g., one or more random access memory (RAM) components, read-only memory (ROM) components, cache memory components, buffer components, database components, and/or other memory devices), one or more processing devices (e.g., one or more CPUs, GPUs, and/or other processing devices), one or more wireless interfaces (e.g., including one or more transceivers and a baseband processor for each wireless interface) for performing wireless communications, one or more wired interfaces (e.g., a serial interface such as a universal serial bus (USB) input, a lightening connector, and/or other wired interface) for performing communications over one or more hardwired connections, and/or other components that are not shown in FIG. 2.

FIG. 3 illustrates grouping of frames and analysis of grouped frames. A number of frames 310 are shown at the top of FIG. 3. The frames 310 may be grouped by the frame grouping engine 225 (or a processor) of FIG. 2 into four groups of frames, including a first group 320A, a second group 320B, a third group 320C, and a fourth group 320D. In this example, each group includes sixteen frames. In the example of FIG. 3, the frame groups overlap, such that the second group 320B includes some frames that are also in the first group 320A and includes some frames that are also in the third group 320C. Likewise, the third group 320C includes some frames that are also in the second group 320B and includes some frames that are also in the fourth group 320D. Overlapping of frame groups is optional. For example, in some cases, the frame groups do not overlap. In some cases, each group of frames begins with a frame following a last frame of a previous group.

Each of the four groups of frames 320A, 320B, 320C, and 320D may be input to the NN 330 (e.g., at different points in time) for analysis to determine whether the group of frames includes a defined action that the NN 330 is trained to detect. In some examples, because the frames may be analyzed by the NN 330 while additional frames are still being received from the image sensor 115, the NN 330 may analyze the first group of frames 320A before all of the frames in the second group of frames 320B, the third group of frames 320C, and/or the fourth group of frames 320D have been received from the image sensor 115 by the DSP 130 and/or by the ISP 120. Likewise, the NN 330 may analyze the second group of frames 320B before all of the frames in the third group of frames 320C and/or the fourth group of frames 320D have been received from the image sensor 115 by the DSP 130 and/or by the ISP 120. The NN 330 may analyze the third group of frames 320C before all of the frames in the fourth group of frames 320D have been received from the image sensor 115 by the DSP 130 and/or by the ISP 120.

The NN 330 of FIG. 3 may output one or more probabilities that one or more of a number of actions are depicted within one or more groups of frames. For example, the NN 330 may output a first set of probabilities 340A based on the analysis of the first group of frames 320A, a second set of probabilities 340B based on the analysis of the second group of frames 320B, a third set of probabilities 340C based on the analysis of the third group of frames 320C, and a fourth set of probabilities 340D based on the analysis of the fourth group of frames 320D.

The NN 330 may indicate via the first set of probabilities 340A that the first group of frames 320A is likely (74%) to depict running, unlikely (3%) to depict jumping, unlikely (2%) to depict throwing, unlikely (1%) to depict a collision, and very unlikely (0%) to depict diving. Based on one or more of the probabilities in the set of probabilities 340A and based on one or more probability thresholds, a conclusion 350A may be determined that the first group of frames 320A does not include an interesting action. For instance, in some cases, the conclusion 350A that the first group of frames 320A does not include an interesting action may be based on a probability threshold being higher than the highest probability in the first set of probabilities 340A (74% for running), in which case none of the probabilities in the in the first set of probabilities 340A are greater than the probability threshold. In one illustrative example, the probability threshold may be a percentage value such as 75%, 80%, 85%, or 90%, each of which are higher than the 74% running probability. All of these exemplary probability thresholds are greater than the highest probability in the first set of probabilities 340A (74% for running). In some cases, the conclusion 350A may alternately or additionally be based on a previously-defined setting indicating that some of the actions that the NN 330 may detect are to be considered interesting actions, while other actions that the NN 330 may detect are not to be considered interesting actions. For example, running might be previously-defined as an action that should not be considered to be an interesting action, while jumping might be previously-defined as an action that should be considered to be an interesting action. In this example, the conclusion 350A may be based on running having been previously defined to not be an interesting action.

The NN 330 may indicate via the second set of probabilities 340B that the second group of frames 320B is very likely (97%) to depict jumping, unlikely (21%) to depict running, relatively unlikely (3%) to depict diving, unlikely (1%) to depict throwing, and very unlikely (0%) to depict a collision. Based on one or more of the probabilities in the set of probabilities 340B and based on one or more defined probability thresholds, a conclusion 350B may be determined that the second group of frames 320B does include an interesting action. The conclusion 350B may be based on, for example, the probability threshold being lower than the highest probability in the second set of probabilities 340B (97% for jumping). For example, the probability threshold may be set to 75%, 80%, 85%, or 90%, each of which are lower than the 97% jumping probability. For instance, because at least one of the probabilities (97% for jumping) is greater than the probability threshold (e.g., 80% in this example), the conclusion 350B may be determined that the second group of frames 320B does include an interesting action. The conclusion 350B may alternately or additionally be based on a previously-defined setting indicating that some of the actions that the NN 330 may detect are to be considered interesting actions, while other actions that the NN 330 may detect are not to be considered to be interesting action. For example, running might be previously-defined as an action that should not be considered to be an interesting action, while jumping might be previously-defined as an action that should be considered to be an interesting action. In this example, the conclusion 350B may be based on jumping having been previously defined to be an interesting action.

The NN 330 indicates via the third set of probabilities 340C that the third group of frames 320C is very likely (94%) to depict jumping, unlikely (17%) to depict running, unlikely (2%) to depict diving, unlikely (2%) to depict a collision, and very unlikely (0%) to depict throwing. Based on one or more of the probabilities in the set of probabilities 340C and based on one or more defined probability thresholds, a conclusion 350C is determined that the third group of frames 320C does include an interesting action. The conclusion 350C may be based on the third set of probabilities 340C including a high 94% probability that the group 320C depicts jumping, that 94% probability exceeding a probability threshold such as 80%, and/or jumping having been previously defined to be an interesting action.

The NN 330 indicates via the fourth set of probabilities 340D that the fourth group of frames 320D is likely (43%) to depict running, unlikely (14%) to depict jumping, unlikely (6%) to depict a collision, very unlikely (0%) to depict throwing, and very unlikely (0%) to depict diving. Based on one or more of the probabilities in the set of probabilities 340D and based on one or more defined probability thresholds, a conclusion 350D is determined that the fourth group of frames 320D does not include an interesting action. The conclusion 350D may be based on the highest probability of the fourth set of probabilities 340D being a low 43% probability that the group 320D depicts running, that 43% probability falling below a probability threshold such as 80%, and/or running having been previously defined to not be an interesting action.

As discussed above, the four sets of probabilities 340A, 340B, 340C, and 340D of FIG. 3 each include multiple probabilities that each identify a probability that a particular action is included in the corresponding group of frames. In other cases, however, a single probability may be used. For example, even when the NN 330 is trained to identify multiple types of actions, a single probability may be output that the group of frames depicts one or more of the actions that the NN 330 is trained to detect. In the context of the sets of probabilities 340A, 340B, 340C, and 340D of FIG. 3, for example, such a single probability analysis can include a probability that the corresponding group of frames includes one or more of running, jumping, throwing, collision(s), or diving.

Four example frames 360A, 360B, 360C, and 360D are illustrated in FIG. 3, representing an example of a frame from each of the four groups of frames 320A, 320B, 320C, and 320D. Confirming the sets of probabilities 340A, 340B, 340C, and 340D of FIG. 3, the first example frame 360A from the first group of frames 320A includes a person running, the second example frame 360B from the second group of frames 320B includes a person jumping, the third example frame 360C from the third group of frames 320C includes a person jumping, and the fourth example frame 360D from the fourth group of frames 320D includes a person walking.

FIG. 4 illustrates frame skipping of received frames, which may be performed by the pre-processing engine 215 of FIG. 2. In particular, twelve consecutive received frames 410 are illustrated along a diagonal timeline in FIG. 4. These frames are numbered consecutively as frames 430A, 430B, 430C, 430D, 430E, 430F, 430G, 430H, 430J, 430K, 430L, 430M, 430N, 430P, 430Q, and 430R. Every fourth frame of the received frames 410 is illustrated with a bold outline and a shaded interior, while the remaining frames (other than every fourth frame) of the received frames 410 is illustrated with a dashed outline and a white interior. The frames illustrated with the bold outline and a shaded interior—that is, frames 430D, 430H, 430M, and 430R—signify frames that have been selected to be retained during pre-processing 215 and thus are to be used as input for the NN 230. These frames selected during pre-processing 215 are also shown in an updated set of frames 420 that includes those frames. The frames illustrated with the dashed outline and the white interior—that is, frames 430A, 430B, 430C, 430E, 430F, 430G, 430J, 430K, 430L, 430N, 430P, and 430Q—may be dropped or skipped during pre-processing 215 and may not be used as an input for the NN 230, and therefore do not appear in the updated set of frames 420.

While the frame skipping process illustrated as 400 of FIG. 4 includes keeping every fourth frame for use as an input to the NN 230 and dropping frames other than the kept frames (other than every fourth frame), the frame dropping algorithm may keep and/or drop any number of frames. For example, the frame dropping algorithm may keep every $N^{th}$ frame for use as an input to the NN 230 and drop frames other than the kept frames (i.e., other than every $N^{th}$ frame). Alternately, the frame dropping algorithm may drop every $N^{th}$ frame and keep frames other than the dropped frames (i.e., other than every $N^{th}$ frame) for use as an input to the NN 230.

FIG. 5 is a diagram illustrating downsampling of received frames. Downsampling of received frames may be performed by the pre-processing engine 215 of FIG. 2. As an illustrative example, a ten pixel by ten pixel frame 510 is shown, with the first two rows 540 being identified. The same frame is illustrated with its pixels grouped into two pixel by two pixel bins (shown as the frame with binned pixels 515). Because the bins are two pixels by two pixels in size, the binning of the frame 510 into the frame with binned pixels 515 may begin before all of the rows of the frame 510 have been received by the frame grabber 210, as long as at least the first two rows of pixels 540 have been received. The color values and/or luminance values for the four pixels in each two pixel by two pixel bin (from the frame with binned pixels 515) may be averaged to produce a single pixel per bin (shown as pixel data averaged in each bin 520). As shown in FIG. 5, the pixels that were in the first two rows 540 in the original frame 510 have now been averaged into a single row of pixels 545. A downsampled five pixel by five pixel frame 525 may be generated based on the original ten pixel by ten pixel frame 510, with each pixel of the five by five pixel frame 525 including an average from each of the bins.

While the downsampling process illustrated as 500 of FIG. 5 includes grouping pixels into two pixel by two pixel bins (in the frame with binned pixels 515) and averaging the values of the pixels in those bins (pixel data averaged in each bin 520), the bins may be of different sizes. For example, the bins may be Y pixels in height by X pixels in width, where Y and X may both be any positive integer, such as 1, 2, 3, 4, 5, 10, 15, 20, 25, 30, 35, 40, 50, or any other suitable integer greater than 0. Y and X may be equal to each other, or may be different values. In such cases, downsampling of a frame may begin as soon as the frame grabber 210 has received at least the first Y rows of a frame and/or as soon as the frame grabber has received at least the first X columns of the frame (or of the first Y rows if the frame grabber 210 receives data pixel-by-pixel).

While the description above of FIG. 5 discusses averaging pixel values, in some cases downsampling may instead or additionally include decimation of pixel values corresponding to certain pixels in a bin, for example so that only a pixel at a certain corner, or a pixel in a center, of the bin is kept. While less accurate than averaging of pixel values in a bin, decimation is generally faster, and may therefore be useful if the frames received have a very high resolution. In some cases, the downsampling process 500 of FIG. 5 is performed multiple times for each frame. For one downsampling process 500 for a frame, decimation may be used, while for another downsampling process 500 for the frame, averaging may be used. For example, for a frame with a very high resolution, one or more first downsampling passes may use decimation to quickly and efficiently reduce the size of the frame, since high resolution images often include large swaths of relatively similar pixels, while one or more later downsampling passes may use averaging to retain accuracy once the frame has already been reduced in size.

Figure 6:
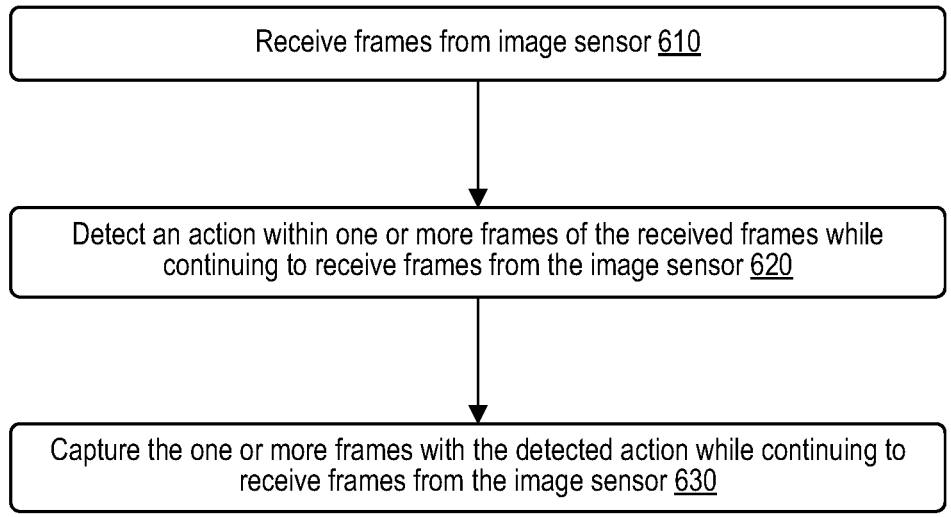
FIG. 6 is a flow diagram illustrating operations for processing visual media.

FIG. 6 is a flow diagram illustrating operations for processing visual media. The operations of the process 600 shown in FIG. 6 may be performed by one or more processors 910, which may be an ISP 120, a DSP 130, any type of processor 910 discussed with respect to FIG. 9, or some combination thereof.

At step 610, the one or more processors may receive frames from an image sensor. The description of step 705 of the operations 700 of FIG. 7 below may apply to step 610 of the operations 600 of FIG. 6. At step 620, the one or more processors may detect an action within one or more frames of the received frames while continuing to receive frames from the image sensor. The description of step 730 of the operations 700 of FIG. 7 below may apply to step 620 of the operations 600 of FIG. 6. At step 630, the one or more processors may capture the one or more frames with the detected action while continuing to receive frames from the image sensor. The term "capture" in the context of step 630 may in some cases refer to generation and/or encoding of media (e.g., one or more images and/or videos) that includes the one or more frames, for example via the media encoder 255. The term "capture" in the context of step 630 may in some cases refer to storage in memory 140 of the one or more frames or of media including the one or more frames. The description of step 740 of the operations 700 of FIG. 7 below may apply to step 630 of the operations 600 of FIG. 6.

Figure 7:
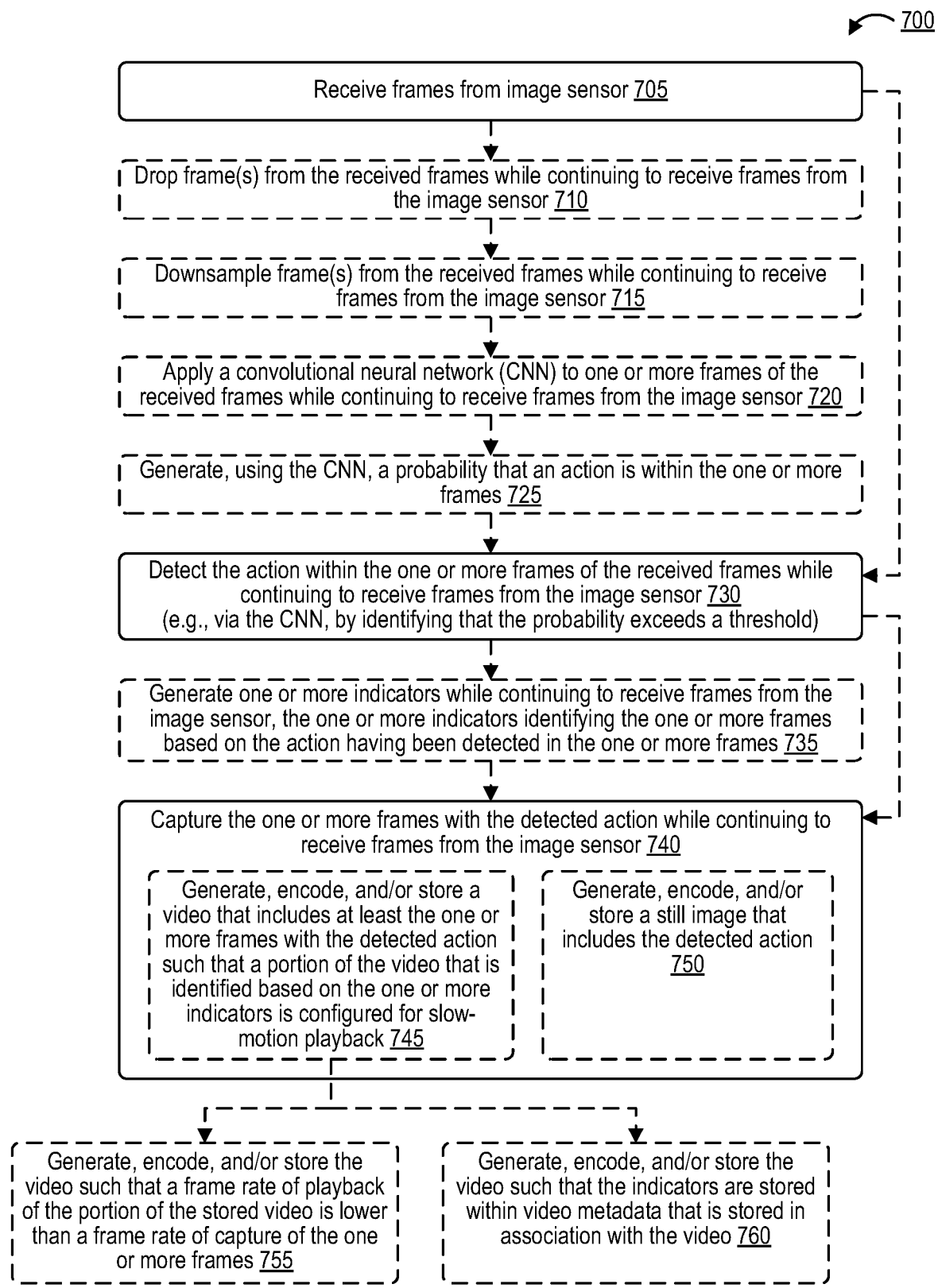
FIG. 7 is a flow diagram illustrating frame processing for performance of a capture event.

FIG. 7 is a flow diagram illustrating frame processing for performance of a capture event. The operations of the process 700 shown in FIG. 7 may be performed by one or more processors 910, which may be an ISP 120, a DSP 130, any type of processor 910 discussed with respect to FIG. 9, or some combination thereof. The operations 700 of FIG. 7 may represent examples of the operations 600 of FIG. 6. Some of the operations 700 of FIG. 7 are optional, as indicated by the dotted outline of the boxes representing those steps (e.g., step 710, step 715, step 720, step 725, step 735, step 745, step 750, step 755, and step 760).

Figure 9:
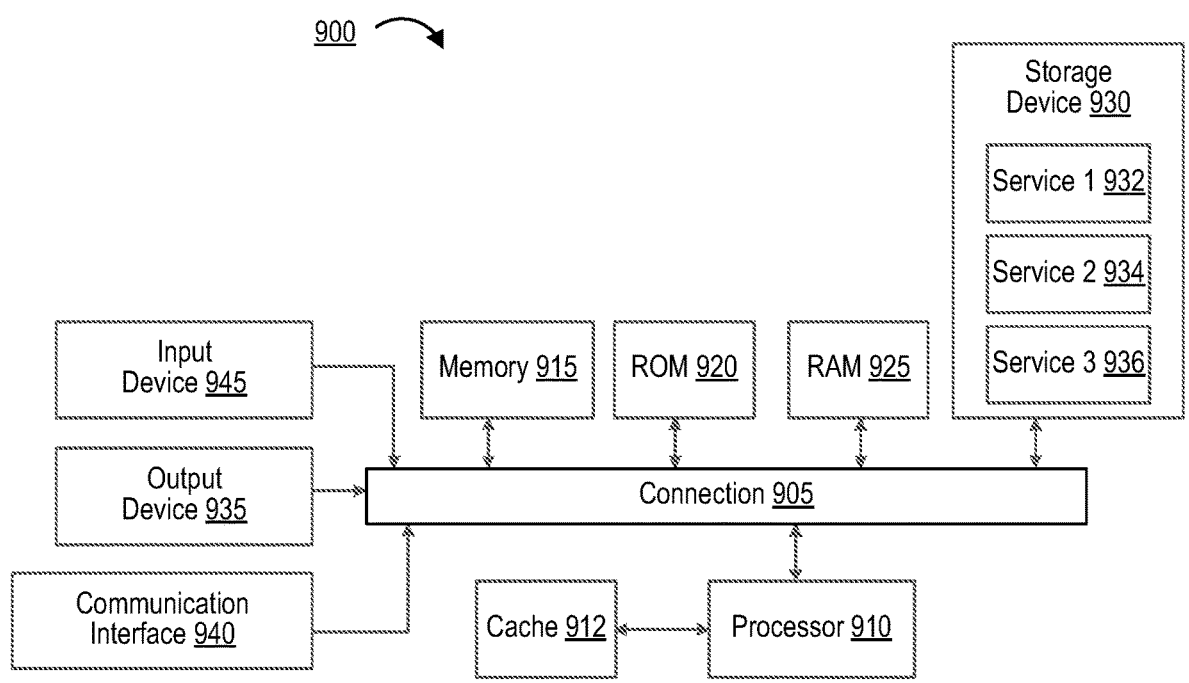
FIG. 9 is a diagram illustrating an example of a system for implementing certain aspects of the present technology.

At step 705, the one or more processors may receive frames from an image sensor, for example using the image sensor interface 205, the frame grabber 210, the frame grabber 240, the one or more processors 910 of FIG. 9, or some combination thereof. At optional step 710, the one or more processors may drop one or more frames from the received frames while continuing to receive frames from the image sensor 115, as discussed further with respect to the frame dropping operations 400 of FIG. 4. At optional step 715, the one or more processors may downsample one or more frames from the received frames while continuing to receive frames from the image sensor 115, as discussed further with respect to the downsampling operations 400 of FIG. 4. Optional steps 710 and 715 may correspond to the pre-processing engine 215 of FIG. 2.

At optional step 720, the one or more processors may apply a convolutional neural network (CNN) to one or more frames of the received frames while continuing to receive frames from the image sensor 115. For example, the CNN can be applied to one or more frames of a video while other frames of the video are still being received at the one or more processors from the image sensor. The one or more frames mentioned in step 720 may be a group of frames grouped by the frame grouping engine 225 of FIG. 2, such as one of the four groups of frames 320A, 320B, 320C, and 320D illustrated in FIG. 3. The CNN mentioned in step 720 may be the NN 230 of FIG. 2. At optional step 725, the one or more processors may generate, using the CNN, a probability that an action is within the one or more frames. Like the four probability analyses 340A, 340B, 340C, and 340D described with respect to FIG. 3, the probability of step 720 may be a probability that a particular action (e.g., jumping) of a set of one or more defined actions that the CNN is trained to recognize (e.g., running, jumping, throwing, collision, diving) is depicted within the one or more frames. Alternately, the probability of step 725 may be a probability that any of a set of one or more defined actions that the CNN is trained to recognize is depicted within the one or more frames.

At step 730, the one or more processors may detect the action within the one or more frames of the received frames while continuing to receive frames from the image sensor 115. The action may optionally be detected at step 730 based on the probability determined in step 725 exceeding a probability threshold, which may be previously defined.

At optional step 735, the one or more processors may generate one or more indicators while continuing to receive frames from the image sensor 115. The one or more indicators generated at step 735 may identify the one or more frames in which the action is detected at step 735 based on the action having been detected in the one or more frames. In some examples, the one or more indicators may include one or more timestamps identifying certain frames based on times at which those frames were recorded by an image sensor 115, received by a device 100 from an image sensor 115, or played back within a video. The timestamps may be absolute or may be relative to other frames of the received frames. In some cases, the indicators may include a timestamp of a first frame of the one or more frames and/or a timestamp of a last frame of the one or more frames. In some examples, the one or more indicators may include one or more frame numbers identifying position(s) of certain frames of the one or more frames within a sequential numbering of the received frames, for example including a frame number of a first frame of the one or more frames and/or a frame number of a last frame of the one or more frames. The one or more indicators may in some cases be used as and/or referred to as tags, or in some cases may be used as and/or referred to as triggers for capture events.

At step 740, the one or more processors may capture at least the one or more frames in which the action is detected at step 730, optionally while continuing to receive frames from the image sensor 115. The term "capture" in the context of step 740 may in some cases refer to generation and/or encoding of media (e.g., one or more images and/or videos) that includes the one or more frames, for example via the media encoder 255. The term "capture" in the context of step 740 may in some cases refer to storage in memory 140 of the one or more frames or of media including the one or more frames. In some cases, capturing at least the one or more frames in which the action is detected includes capturing only the one or more frames. In other cases, capturing at least the one or more frames includes capturing more than just the one or more frames (e.g., capturing at least a subset of the received frames that includes the one or more frames), and optionally identifying the one or more frames (e.g., for slow-motion playback) within the larger set via the one or more indicators generated at step 735. In some cases, capturing the at least the one or more frames includes encoding at least the one or more frames as one or more visual media files via media encoder 255, for example including one or more still image files and/or one or more video files, and storing the one or more media files in the storage medium 140. In some cases, the captured one or more frames are the alternate versions of the one or more frames that have been processed by the one or more image processing algorithms 250, which are distinct from the versions of the one or more frames that were pre-processed at steps 710 and 715 and input into the CNN at step 720. The alternate versions of the one or more frames may include additional frames (due to not dropping frames at step 710), may have a higher resolution (due to not downsampling frames at step 715), and may be of a higher quality and more visually appealing (due to application of the one or more image processing algorithms 250). Step 740 may optionally include optional step 745 and/or optional step 750.

At optional step 750, the one or more processors may generate, encode (via media encoder 255), and/or store (in the storage medium 140 of FIG. 1) one or more still images that include the action detected at step 730. The one or more still images may include the first of the one or more frames, the last of the one or more frames, a middle frame of the one or more frames, a frame for which the probability of including the detected action as generated at step 725 is highest of the one or more frames, at least one frame neighboring any of the above-listed frames, or some combination thereof. In some cases, once the still image is captured, receipt of additional frames from the image sensor 115 may cease. In other cases, once the still image is captured, receipt of additional frames from the image sensor 115 may continue.

At optional step 745, the one or more processors may generate, encode (via media encoder 255), and/or store (in the storage medium 140) one or more videos that include at least the one or more frames with the detected action such that a portion of the video that is identified based on the one or more indicators is configured for slow-motion playback. Video encoding may include encapsulating the video in an ISO base media file format (ISOBMFF) container or other format. Video encoding at step 745 may be performed in different ways, as explained further in optional steps 755 and 760.

At optional step 755, the one or more processors may generate, encode, and/or store the video such that a frame rate of playback of the portion of the stored video is lower than an image sensor frame rate of the one or more frames. The video generated in optional step 755 may optionally include the slow-motion "hard-coded" into the video, and may also include dropping frames in portions of the video that do not include detected actions and therefore are not configured for slow-motion playback. For example, the video generated in optional step 755 may be generated based on frames recorded at a high image sensor frame rate of 960 fps, and may include an interesting portion of video that includes an interesting action detected at step 730 and an uninteresting portion of video that does not include an interesting action, as discussed with respect to FIG. 3. If the playback frame rate of the video is set to 30 fps, all 960 frames of each second of the interesting portion of video that was received from the image sensor 115 may be kept (or one or more frames might be dropped as discussed in FIG. 4, for example dropping each 960 frames to 270 frames, if a faster slow motion effect is desired). The uninteresting portion of video, on the other hand, may drop/skip a significant amount of frames as discussed in FIG. 4 so that each second that was received from the image sensor 115 only retains 30 of the 960 frames, effectively equalizing the image sensor frame rate and the playback frame rate so that the uninteresting portion of video is not played back in slow motion.

In some cases, where multiple interesting portions exist in a single video, one interesting portion may be configured for slower slow-motion playback (e.g., more of the original frames are retained) than another interesting portion. For example, a first type of detected action (e.g., jumping, a gunshot) may be deemed more interesting or faster-occurring than a second type of detected action (e.g., running, walking) and thus frames in which the first type of detected action has been detected may be played back more slowly than frames in which the second type of detected action has been detected. One benefit of video capture/generation/encoding as discussed in step 755 is that storage space is saved, as only interesting portions of the video are stored at a high frame rate (HFR) such as 960 fps, while uninteresting portions of a video are stored at a low frame rate (LFR) such as 30 fps.

At optional step 760, the one or more processors may generate, encode, and/or store the video such that the indicators generated at step 735 are stored within video metadata that is stored in association with the video. For example, the video metadata may be stored as part of the same file as the video (e.g., as metadata in an ISOBMFF file or file having another container format), or may be stored as a separate metadata file that is associated with the video file, such that the metadata file optionally includes a pointer or address of the video file and/or the video file optionally includes a pointer or address of the metadata file. In one illustrative example, the metadata may be stored in the ISO container with the video.

In the case of step 760, the entire video may be maintained at a high frame rate. For example, all of the frames of the video are kept, or all of the frames of the video undergo a round of frame dropping as discussed in FIG. 4 that still leaves the video at a high frame rate (e.g., a frame dropping that drops the frames from 960 fps to 270 fps). Metadata included in the video file can include the indicators, which may for example identify to a video player that slow-motion playback should begin when playback of the video reaches a first timestamp (or a first frame number) and should end when playback of the video reaches a second timestamp (or a second frame number). The indicators may alternately identify that slow-motion playback should begin when playback of the video reaches a first timestamp (or a first frame number) and should end a certain predetermined duration of time (or a certain predetermined duration of frames) later unless another indicator is encountered before then. The indicators may alternately identify that slow-motion playback should begin when playback of the video is a pre-defined time (or number of frames) before a first timestamp (or frame number), and end either at the first timestamp (or frame number) or the pre-defined time (or number of frames) after the first timestamp (or frame number).

When the video generated via optional step 760 is played back, the video player may play back uninteresting portions (in which actions are not detected at step 730) at a high playback frame rate that matches the high image sensor frame rate that the video is encoded in, so that the uninteresting portions are not played back in slow motion. Alternately, the video player may drop frames during or prior to playback of uninteresting portions (in which actions are not detected at step 730) so that a low playback frame rate may be used and the uninteresting portions are still not played back in slow motion. The video player may play back interesting portions (in which actions are detected at step 730) at a lower playback frame rate than the high image sensor frame rate that the video is encoded in, so that the interesting portions are played back in slow motion.

In some cases, such as those where multiple interesting portions exist in a single video, the metadata may include information corresponding to one or more of the indicators that identifies how slowly each interesting portion should be played at, for example by identifying a playback frame rate. In such cases, different interesting portions of the video may be played back at different speeds (e.g., at different playback frame rates). For example, a first type of detected action (e.g., jumping, a gunshot, or other action) may be deemed more interesting and/or faster-occurring than a second type of detected action (e.g., running, walking, or other action), and thus frames in which the first type of detected action has been detected may be played back more slowly than frames in which the second type of detected action has been detected. One benefit of video capture/generation/encoding as discussed in step 760 is that the metadata may be edited manually or automatically after generation, frame data is retained, and application of slow-motion is thus non-destructive with regard to frames.

In some cases, outlier "interesting" portions of video may be removed. For example, if a set of one or more frames has an action detected via step 730, but none (or less than a threshold number) of the neighboring or overlapping sets of one or more frames has an action detected via step 730, then the set of one or more frames with the action detected via step 730 may be recognized as an outlier and may be considered uninteresting. The outlier set of one or more frames can be configured for non-slow-motion playback. In some examples, a threshold number of consecutive and/or partially overlapping groups of frames must be identified as having an action detected via step 730 before the corresponding portion of video is configured for slow-motion playback.

In some examples, the process 700 may be performed by a computing device or apparatus, such as a computing device having the computing device architecture 900 shown in FIG. 9. For instance, the computing device (e.g., performing the process 900) can include a camera, a device including a camera (e.g., a mobile phone, a tablet computer, a laptop computer, or other device), or other computing device. In some cases, the computing device or apparatus may include an input device, an output device, one or more processors, one or more microprocessors, one or more microcomputers, and/or other component(s) that is/are configured to carry out the steps of the process 700. The computing device may further include a display (as an example of the output device or in addition to the output device), a network interface configured to communicate and/or receive the data, any combination thereof, and/or other component(s). The network interface may be configured to communicate and/or receive Internet Protocol (IP) based data or other type of data.

The components of the computing device (e.g., the one or more processors, one or more microprocessors, one or more microcomputers, and/or other component) can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 700 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
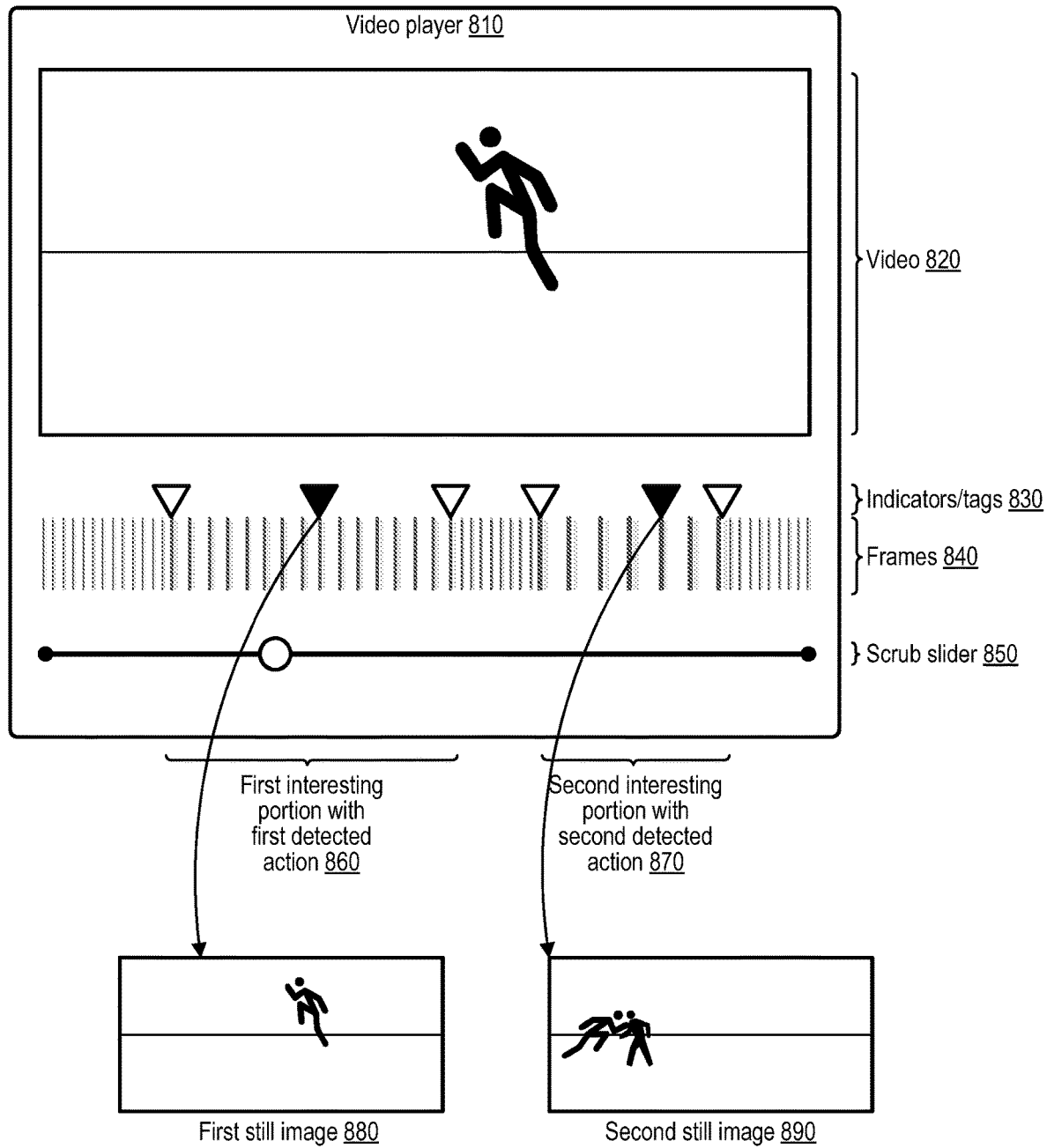
FIG. 8 is a conceptual diagram illustrating a video playback interface that shows indicators identifying portions of the video with detected actions, which are configured for slow-motion playback.

FIG. 8 illustrates a video playback interface that shows indicators identifying portions of the video with detected actions and that are configured for slow-motion playback. In particular, the video playback interface of FIG. 8 may be a video player 810 window that displays a frame of a video 820. The position of the frame in the video is denoted by a white circle along a scrub slider 850. The left side of the black line of the scrub slider 850 represents the beginning of the video 820, while the right side of the black line of the scrub slider 850 represents the end of the video 820. The video 820 may be generated, encoded, and stored according to step 760.

The video player 810 window of FIG. 8 also illustrates frames 840 as a sequence of parallel vertical black lines. Each frame of the frames 840 is illustrated as a single vertical black line. The video player 810 window of FIG. 8 also illustrates indicators 830 as generated in step 735, for example as stored in metadata of step 760, which are represented as black and white triangles whose lower vertices point to a particular frame. The white triangles represent boundaries (i.e., beginnings of endings) of one or more consecutive interesting portions of video in which actions have been detected at step 730. The video 820 includes two interesting portions—a first interesting portion with a first detected action 860 and a second interesting portion with a second detected action 870. The first and last frames of the first interesting portion with the first detected action 860 are marked by white-triangle indicators 830, which may be stored in metadata as timestamps and/or frame numbers corresponding to those frames. Likewise, the first and last frames of the second interesting portion with the second detected action 870 are marked by white-triangle indicators 830, which may be stored in metadata as timestamps and/or frame numbers corresponding to those frames. The frames 840 as illustrated show that the uninteresting portions of the video (other than the first interesting portion and the second interesting portion) are being played back at a high playback frame rate (relative to the first interesting portion and the second interesting portion), matching the high image sensor frame rate that the video 820 is recorded and/or encoded in, so that the uninteresting portions are not played back in slow motion. The frames 840 as illustrated show that the first interesting portion and the second interesting portion of the video are being played back at a lower playback frame rate (relative to the uninteresting portion), which would be lower than the high image sensor frame rate that the video 820 is recorded and/or encoded in, so that the first interesting portion and the second interesting portion are played back in slow motion. The frames 840 as illustrated further show that the second interesting portion of the video with the second detected action 870 is played back even more slowly than the first interesting portion of the video with the first detected action 860.

Two more indicators 830 are illustrated as black triangles whose lower vertex points to a particular frame of the illustrated frames 840. These two black-triangle indicators 830 correspond to two still images that are captured, encoded, and stored as in step 750. In particular, the first interesting portion of the video with the first detected action 860 includes a first black-triangle indicator 830 from which an arrow extends downward to a first still image 880 showing a person jumping, where jumping is presumably the first detected action 860. The first still image 880 takes place only two frames after the frame at which the video 820 is currently at based on the scrub slider 850, and thus these look similar. The second interesting portion of the video with the second detected action 870 includes the second black-triangle indicator 830 from which an arrow extends downward to a second still image 890 showing the person from the first still image 880 colliding with another person, where a collision is presumably the second detected action 870. Because the video capture, generation, and encoding process of step 760 is non-destructive, the video player 810 interface of FIG. 8 may also be a video editor interface in which a viewer can drag any of the indicators 830 to different frames to modify the timestamps and/or frame numbers at which slow-motion should start and/or stop, create new indicators 830, delete indicators, edit how slow certain interesting or uninteresting portions of the video 820 should be played back, or some combination thereof. In some cases, certain uninteresting portions may be played back in fast-motion or fast-forwarded, which may be hard-coded into the video as discussed with respect to step 755 or may be an attribute or tag or indicator stored in metadata as discussed with respect to step 760.

FIG. 9 shows an example of computing system 900, which can be for example any computing device making up internal computing system, a remote computing system, a camera (e.g., camera 100), or any component thereof in which the components of the system are in communication with each other using connection 905. Connection 905 can be a physical connection via a bus, or a direct connection into processor 910, such as in a chipset architecture. Connection 905 can also be a virtual connection, networked connection, or logical connection.

In some embodiments, computing system 900 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 900 includes at least one processing unit (CPU or processor) 910 and connection 905 that couples various system components including system memory 915, such as read-only memory (ROM) 920 and random access memory (RAM) 925 to processor 910. Computing system 900 can include a cache of high-speed memory 912 connected directly with, in close proximity to, or integrated as part of processor 910.

Processor 910 can include any general purpose processor and a hardware service or software service, such as services 932, 934, and 936 stored in storage device 930, configured to control processor 910 as well as a special-purpose processor where software instructions are incorporated into the actual processor design. Processor 910 may essentially be a completely self-contained computing system, containing multiple cores or processors, a bus, memory controller, cache, etc. A multi-core processor may be symmetric or asymmetric.

To enable user interaction, computing system 900 includes an input device 945, which can represent any number of input mechanisms, such as a microphone for speech, a touch-sensitive screen for gesture or graphical input, keyboard, mouse, motion input, speech, etc. Computing system 900 can also include output device 935, which can be one or more of a number of output mechanisms known to those of skill in the art. In some instances, multimodal systems can enable a user to provide multiple types of input/output to communicate with computing system 900. Computing system 900 can include communications interface 940, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 940 may also include one or more Global Navigation Satellite System (GNSS) receivers or transceivers that are used to determine a location of the computing system 900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 930 can include software services, servers, services, etc., that when the code that defines such software is executed by the processor 910, it causes the system to perform a function. In some embodiments, a hardware service that performs a particular function can include the software component stored in a computer-readable medium in connection with the necessary hardware components, such as processor 910, connection 905, output device 935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set or "one or more of a set" indicates that one member of the set or multiple members of the set satisfy the claim. For example, claim language reciting "at least one of A and B" means A, B, or A and B. In another example, claim language reciting "one or more of A and B" means A, B, or A and B. In another example, claim language reciting "one or more of A, B, and C" means A, B, C, A and B, A and C, B and C, or all of A, B, and C.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of processing visual media, the method comprising:
   receiving frames from an image sensor;
   storing the received frames in a temporary volatile memory;
   applying a convolutional neural network (CNN) to the frames;
   determining, using the CNN, a probability that an action is associated with one or more frames of the stored frames;
   detecting the action within the one or more frames while continuing to receive frames from the image sensor, wherein detecting the action within the one or more frames is based on identifying that the probability exceeds a threshold;
   in response to detecting the action within the one or more frames based on identifying that the probability exceeds the threshold, generating one or more indicators identifying at least one frame associated with the detected action while continuing to receive frames from the image sensor;
   capturing at least one frame before the detected action and the one or more frames associated with the detected action while continuing to receive frames from the image sensor;
   modifying at least the one or more frames associated with the detected action in response to detection of the one or more indicators identifying the at least one frame associated with the detected action such that a first frame rate of playback of the at least one frame before the detected action is higher than a second frame rate of playback of the one or more frames associated with the detected action; and
   storing a video that includes the at least one frame before the detected action and the one or more frames associated with the detected action.

2. The method of claim 1, wherein the second frame rate of playback of the one or more frames is lower than an image sensor frame rate of the one or more frames associated with the detected action as received from the image sensor.

3. The method of claim 1, wherein storing the video includes storing the one or more indicators within video metadata that is stored in association with the video.

4. The method of claim 1, wherein capturing the one or more frames associated with the detected action includes:
   storing a still image that includes the detected action.

5. The method of claim 1, further comprising:
   downsampling one or more of the one or more frames before applying the CNN to the one or more frames.

6. The method of claim 1, further comprising:
   dropping one or more of the one or more frames before applying the CNN to the one or more frames.

7. An apparatus for processing visual media, the apparatus comprising:
   an image sensor;
   a temporary volatile memory; and a processor coupled to the temporary volatile memory, the processor implemented in circuitry and configured to:
  receive frames from an image sensor;
  store the received frames in the temporary volatile memory;
  apply a convolutional neural network (CNN) to the frames;
  determine, using the CNN, a probability that an action is associated with one or more frames of the stored frames;
  detect the action within the one or more frames while continuing to receive frames from the image sensor, wherein detecting the action within the one or more frames is based on identifying that the probability exceeds a threshold;
  in response to detecting the action within the one or more frames based on identifying that the probability exceeds the threshold, generate one or more indicators identifying at least one frame associated with the detected action while continuing to receive frames from the image sensor;
  capture at least one frame before the detected action and the one or more frames associated with the detected action while continuing to receive frames from the image sensor;
  modify at least the one or more frames associated with the detected action in response to detection of the one or more indicators identifying the at least one frame associated with the detected action such that a first frame rate of playback of the at least one frame before the detected action is higher than a second frame rate of playback of the one or more frames associated with the detected action; and
  store a video that includes the at least one frame before the detected action and the one or more frames associated with the detected action.

8. The apparatus of claim 7, wherein the second frame rate of playback of the one or more frames is lower than an image sensor frame rate of the one or more frames associated with the detected action as received from the image sensor.

9. The apparatus of claim 7, wherein, to store the video, the processor is configured to:
  store the one or more indicators within video metadata that is stored in association with the video.

10. The apparatus of claim 7, wherein, to capture the one or more frames associated with the detected action, the processor is configured to:
  store a still image that includes the detected action.

11. The apparatus of claim 7, wherein the processor is configured to:
  downsample one or more of the one or more frames before applying the CNN to the one or more frames.

12. The apparatus of claim 7, wherein the processor is configured to:
  drop one or more of the one or more frames before applying the CNN to the one or more frames.

13. The apparatus of claim 7, wherein the apparatus comprises a camera.

14. The apparatus of claim 7, wherein the apparatus comprises a mobile device.

15. The apparatus of claim 7, further comprising a display configured to display a portion of the video.

16. A non-transitory computer readable medium having stored thereon instructions that, when executed by one or more processors, cause the one or more processors to:
  receive frames from an image sensor;
  store the received frames in a temporary volatile memory;
  apply a convolutional neural network (CNN) to the frames;
  determine, using the CNN, a probability that an action is associated with one or more frames of the stored frames;
  detect the action within the one or more frames while continuing to receive frames from the image sensor, wherein detecting the action within the one or more frames is based on identifying that the probability exceeds a threshold;
  in response to detecting the action within the one or more frames based on identifying that the probability exceeds the threshold, generate one or more indicators identifying at least one frame associated with the detected action while continuing to receive frames from the image sensor;
  capture at least one frame before the detected action and the one or more frames associated with the detected action while continuing to receive frames from the image sensor;
  modify at least the one or more frames associated with the detected action in response to detection of the one or more indicators identifying the at least one frame associated with the detected action such that a first frame rate of playback of the at least one frame before the detected action is higher than a second frame rate of playback of the one or more frames associated with the detected action; and
  store a video that includes the at least one frame before the detected action and the one or more frames associated with the detected action.

17. The non-transitory computer readable medium of claim 16, wherein the second frame rate of playback of the one or more frames is lower than an image sensor frame rate of the one or more frames associated with the detected action as received from the image sensor.

18. The non-transitory computer readable medium of claim 16, wherein storing the video includes storing the one or more indicators within video metadata that is stored in association with the video.

19. The non-transitory computer readable medium of claim 16, wherein capturing the one or more frames with the detected action includes:
  storing a still image that includes the detected action.

* * * * *